United States Patent
Ando

(10) Patent No.: US 7,577,276 B2
(45) Date of Patent: Aug. 18, 2009

(54) FINGERPRINT MATCHING DEVICE AND METHOD, RECORDING MEDIUM, AND PROGRAM

(75) Inventor: Tatsunobu Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 374 days.

(21) Appl. No.: 10/541,436

(22) PCT Filed: Dec. 8, 2003

(86) PCT No.: PCT/JP03/15647

§ 371 (c)(1), (2), (4) Date: Jul. 5, 2005

(87) PCT Pub. No.: WO2004/061770

PCT Pub. Date: Jul. 22, 2004

(65) Prior Publication Data

US 2006/0153431 A1  Jul. 13, 2006

(30) Foreign Application Priority Data

Jan. 6, 2003  (JP)  ............................ 2003-000120

(51) Int. Cl.
*B42D 15/00* (2006.01)
*G06K 9/00* (2006.01)
*G06K 9/46* (2006.01)

(52) U.S. Cl. ..................... 382/124; 382/125; 382/190; 283/68; 283/78

(58) Field of Classification Search .................. 382/124
See application file for complete search history.

(56) References Cited

U.S. PATENT DOCUMENTS 5,040,224 A * 8/1991 Hara ........................... 382/124
5,901,239 A * 5/1999 Kamei ......................... 382/125
6,002,787 A * 12/1999 Takhar et al. ................ 382/125
6,041,133 A * 3/2000 Califano et al. ............. 382/124
6,233,348 B1 * 5/2001 Fujii et al. ................... 382/125
6,330,347 B1 * 12/2001 Vajna .......................... 382/125
6,757,411 B2 * 6/2004 Chau .......................... 382/125
7,035,444 B2 * 4/2006 Kunieda et al. ............. 382/125
7,260,246 B2 * 8/2007 Fujii .......................... 382/124
2002/0071598 A1 * 6/2002 Kunieda et al. ............. 382/125
2003/0035569 A1 * 2/2003 Chau .......................... 382/124

FOREIGN PATENT DOCUMENTS

| EP | 1 197 912 | 4/2002 |
|---|---|---|
| JP | 10-63849 | 3/1998 |
| JP | 10 63849 | 3/1998 |
| JP | 2002 190031 | 7/2002 |
| JP | 2002-190031 | 7/2002 |

* cited by examiner

*Primary Examiner*—Bhavesh M Mehta
*Assistant Examiner*—Michael Vanchy, Jr.
(74) *Attorney, Agent, or Firm*—Frommer Lawrence & Haug LLP; William S. Frommer; Thomas F. Presson

(57) ABSTRACT

The present invention relates to a fingerprint collation apparatus and method, a recording medium and a program, which can increase the throughput of fingerprint collation and decrease a data amount therefor. An information processing apparatus characterized by first detection means for detecting from a fingerprint image first feature points which include one of ridge bifurcations and ridge endings of a fingerprint; first generation means for generating a triangle which connects three arbitrary points close to one another from among the plurality of first feature points; first calculation means for calculating an area and a length of each side of the triangle generated by the first generation means; and storage means for storing the area and the length of each side of the triangle calculated by the first calculation means.

11 Claims, 25 Drawing Sheets

FINGERPRINT MATCHING DEVICE AND METHOD, RECORDING MEDIUM, AND PROGRAM

TECHNICAL FIELD

The present invention relates to a fingerprint collation apparatus and method, a recording medium and a program and, more particularly, to a fingerprint collation apparatus and method, a recording medium and a program for reducing the volume of data to be stored.

BACKGROUND ART

A fingerprint collation apparatus which reads the fingerprint of a finger of a user, verifies the fingerprint and authenticates the user is applied to various apparatuses.

As examples of techniques for reading a finger's fingerprint and registering the fingerprint, there are, for instance, a so-called minutiae method and a pattern matching method.

In the minutiae method, during the registration of a fingerprint to be read, for example, a fingerprint image is first binarized and thinned, and feature points such as ridge endings and ridge bifurcations are extracted from the thinned image. Then, a predetermined number of pixels are traced along a thin line from a feature point and this traced section is extracted as a partial thin line, and this partial thin line is converted to a sequence of approximate segments. This operation is repeated as to a predetermined number of feature points, so that a sequence of segments made of a continuation of a plurality of segments is extracted. In such manner, the fingerprint image is converted to the sequence of segments, and the coordinates of points at the opposite ends of each of the segments and the coordinates of positions at each of which one of the segments is joined to the adjacent are registered. In addition, if a feature point is a ridge bifurcation, a similar process is repeated as to each of three branched thin lines. Furthermore, the number of ridges which intersect lines each connecting the opposite ends of different partial thin lines are calculated and registered on the basis of the kinds and the coordinates of partial thin lines, thinned images and feature points (refer to Japanese Patent Laid-Open Application No. 1-50175 (hereinafter referred to as Patent Document 1), for example).

In addition, in the collation of a fingerprint by the minutiae method, after a fingerprint image is binarized and thinned, feature amounts are extracted first. Then, a thin line close in position to one of the registered partial thin lines is selected from the obtained thinned image, the patterns of both are compared and if a degree of mismatch is equal to a certain threshold or lower, it is determined that both are the same. In addition, this alignment is sequentially executed as to the feature points of the image subject to collation, and each time a match is found, the alignment of both is performed. The other partial thin lines are shifted by the amount of shifting at this time, and a similar comparison is performed on each of the partial thin lines. Furthermore, the number of intersecting ridges is calculated from the thinned image subject to collation, and this number is compared with the registered number of intersecting ridges and if the rate of matching is equal or higher than a predetermined value, it is determined that authentication has succeeded (refer to, for example, Patent Document 1).

In addition, in the pattern matching method, the whole or part of a fingerprint image is stored as a registered template.

However, in the pattern matching method, because the whole or part of a fingerprint image is stored as a registered template, the size of the registered template is large and a memory capacity corresponding to this large size is necessary, so that the problem of slow throughput occurs.

In addition, if an acquired fingerprint image is rotated (for example, upside down), the fingerprint image is not easy to collate, so that the problem of insufficient accuracy occurs.

Furthermore, the minutiae method (refer to, for example, Patent Document 1) makes use of information indicative of the number of ridges between feature points in addition to information indicative of the positions, the directions and the kinds of the individual feature points (for example, ridge bifurcations and ridge endings), in order to increase authentication accuracy on the basis of the number of the ridges between the features points. In other words, in this method as well, if authentication accuracy is to be increased, a certain degree of template size becomes necessary. Accordingly, the minutiae method still has the problems of slow throughput, large data amount and insufficient accuracy.

DISCLOSURE OF THE INVENTION

The present invention has been made in view of the above-mentioned circumstances, and intends to make it possible to realize an increased throughput, a reduced data amount and as well as an increased accuracy.

A first information processing apparatus according to the present invention is characterized by including first detection means for detecting from a fingerprint image first feature points which include one of ridge bifurcations and ridge endings of a fingerprint; first generation means for generating a triangle which connects three arbitrary points close to one another from among the plurality of first feature points; first calculation means for calculating an area and a length of each side of the triangle generated by the first generation means; and storage means for storing the area and the length of each side of the triangle calculated by the first calculation means.

It is possible to further include a second detection means for detecting a center point which is a center of the fingerprint image; and a sorting means for sorting the first feature points on the basis of a distance between the center point detected by the second detection means and the plurality of first feature points; wherein the first generation means uses the sorted first feature points to generate a triangle which connects three arbitrary points close to one another.

It is possible to have the first detection means further detect second feature points which are the other between the ridge bifurcations and the ridge endings, and further include a second calculation means for calculating at least one of a distance and a direction between a first point and a fourth point which is the one of the second feature points that is closest to the first point, at least either a distance and a direction between a second point and a fifth point which is the one of the second feature points that is closest to the second point, and at least one of a distance and a direction between a third point and a sixth point which is the one of the second feature points that is closet to the third point and the three first feature points which constitute the one triangle are, respectively, the first point, the second point and the third point; the storage means further store at least one of the distance and the direction calculated by the second calculation means, between the first point and the fourth point, between the second point and the fifth point, and between the third point and the sixth point.

It is possible to have a second detection means for detecting a center point which is a center of the fingerprint image; and a sorting means for sorting the second feature points on the basis of a distance detected by the second detection means, between the center point and each of the plurality of first feature points; wherein the second calculation means calculates at least one of the distance and the direction between the first point and the fourth point, between the second point and the fifth point, and between the third point and the sixth point by using the sorted second feature points.

It is possible to further have a second detection means for detecting the first feature points of the fingerprint from the fingerprint image subject to collation; a second generation means for generating a triangle for connecting three arbitrary points close to one another from among the plurality of first feature points of the finger's fingerprint image subject to collation; a second calculation means for calculating an area and a length of each side of the triangle generated by the second generation means; and a comparison means for comparing an area and a length of each side of the triangle stored in the storage means with the area and the length of each side of the triangle of the fingerprint image subject to collation calculated by the second calculation means.

A first information processing method according to the present invention is characterized by having a first detection step of detecting from a fingerprint image first feature points which are either ridge bifurcations and ridge endings of a fingerprint; a first generation step of generating a triangle which connects three arbitrary points close to one another from among the plurality of first feature points; a first calculation step of calculating an area and a length of each side of the triangle generated by the processing of the first generation step; and a storage control step of controlling storage of the area and the length of each side of the triangle calculated by the processing of the first calculation step.

A first program recorded on a recording medium characterized by including a first detection step of detecting from a fingerprint image first feature points which are one of ridge bifurcations and ridge endings of a fingerprint; a first generation step of generating a triangle which connects three arbitrary points close to one another from among the plurality of first feature points; a first calculation step of calculating an area and a length of each side of the triangle generated by the processing of the first generation step; and a storage control step of controlling storage of the area and the length of each side of the triangle calculated by the processing of the first calculation step.

A program characterized by causing a computer to execute processing including a first detection step of detecting from a fingerprint image first feature points which are one of ridge bifurcations and ridge endings of a fingerprint; a first generation step of generating a triangle which connects three arbitrary points close to one another from among the plurality of first feature points; a first calculation step of calculating an area and a length of each side of the triangle generated by the processing of the first generation step; and a storage control step of controlling storage of the area and the length of each side of the triangle calculated by the processing of the first calculation step.

A second information processing apparatus according to the present invention is characterized by including An information processing apparatus characterized by comprising: first detection means for detecting first feature points which are either ridge bifurcations and ridge endings of a fingerprint from a fingerprint image subject to collation; first generation means for generating a triangle which connects three arbitrary points close to one another from among the plurality of first feature points; first calculation means for calculating an area and a length of each side of the triangle generated by the first generation means; and comparison means for comparing the area and the length of each side of the triangle of the fingerprint image subject to collation, which are calculated by the first calculation means, with an area and a length of each side of a triangle of a fingerprint image previously stored.

It is possible to have the first detection means to further detect second feature points which are the other one of the ridge bifurcations and the ridge endings; and further include second calculation means for calculating at least one of a distance or a direction between a first point and a fourth point which is the one of the second feature points that is closest to the first point, at least one of a distance and a direction between a second point and a fifth point which is the one of the second feature points that is closest to the second point, and at least one of a distance and a direction between a third point and a sixth point which is the one of the second feature points that is closest to the third point, and the three first feature points which constitute the one triangle are, respectively, the first point, the second point and the third point; and the comparison means compare an area and a length of each side of the triangle of the fingerprint image subject to collation, which are calculated by the first calculation means and the second calculation means, as well as at least one of the distance and the direction of the fourth point relative to the first point, of the fifth point relative to the second point, and of the sixth point relative to the third point, with an area and a length of each side of the triangle of the stored fingerprint image as well as at least one of the distance and the direction of the fourth point relative to the first point, of the fifth point relative to the second point, and of the sixth point relative to the third point of the fingerprint image subject to collation.

A second information processing method according to the present invention is characterized by including a first detection step of detecting first feature points which are one of ridge bifurcations and ridge endings of a fingerprint, from a fingerprint image subject to collation; a first generation step of generating a triangle which connects three arbitrary points close to one another from among the plurality of first feature points; a first calculation step of calculating an area and a length of each side of the triangle generated by the processing of the first generation step; and a comparison step of comparing the area and the length of each side of the triangle of the fingerprint image subject to collation, which are calculated by the first calculation means, with an area and a length of each side of a triangle of a fingerprint image previously stored.

A second program recorded in a recording medium according to the present invention is characterized by including a first detection step of detecting first feature points which are one of ridge bifurcations and ridge endings of a fingerprint, from a fingerprint image subject to collation; a first generation step of generating a triangle which connects three arbitrary points close to one another from among the plurality of first feature points; a first calculation step of calculating an area and a length of each side of the triangle generated by the processing of the first generation step; and a comparison step of comparing the area and the length of each side of the triangle of the fingerprint image subject to collation, which are calculated by the first calculation means, with an area and a length of each side of a triangle of a fingerprint image previously stored.

A second program recorded according to the present invention is characterized by causing a computer to execute a first detection step of detecting first feature points which are one of ridge bifurcations and ridge endings of a fingerprint, from a fingerprint image subject to collation; a first generation step of generating a triangle which connects three arbitrary points close to one another from among the plurality of first feature points; a first calculation step of calculating an area and a length of each side of the triangle generated by the processing of the first generation step; and a comparison step of comparing the area and the length of each side of the triangle of the fingerprint image subject to collation, which are calculated by the first calculation means, with an area and a length of each side of a triangle of a fingerprint image previously stored.

In the first invention of the present application, first feature points which are either ridge bifurcations or ridge endings of a fingerprint are detected from a fingerprint image, a triangle which connects three arbitrary points close to one another from among the plurality of first feature points is generated, an area and a length of each side of the generated triangle is calculated, and the calculated area and length of each side of the triangle is stored.

In the second invention of the present application, first feature points which are either ridge bifurcations or ridge endings of a fingerprint are detected from a fingerprint image, a triangle which connects three arbitrary points close to one another from among the plurality of first feature points is generated, and an area and a length of each side of the generated triangle is calculated, and the calculated area and length of each side of the triangle of the fingerprint image subject to collation is compared with an area and a length of each side of a triangle of a fingerprint image previously stored.

BEST MODES FOR CARRYING OUT THE INVENTION

Figure 1:
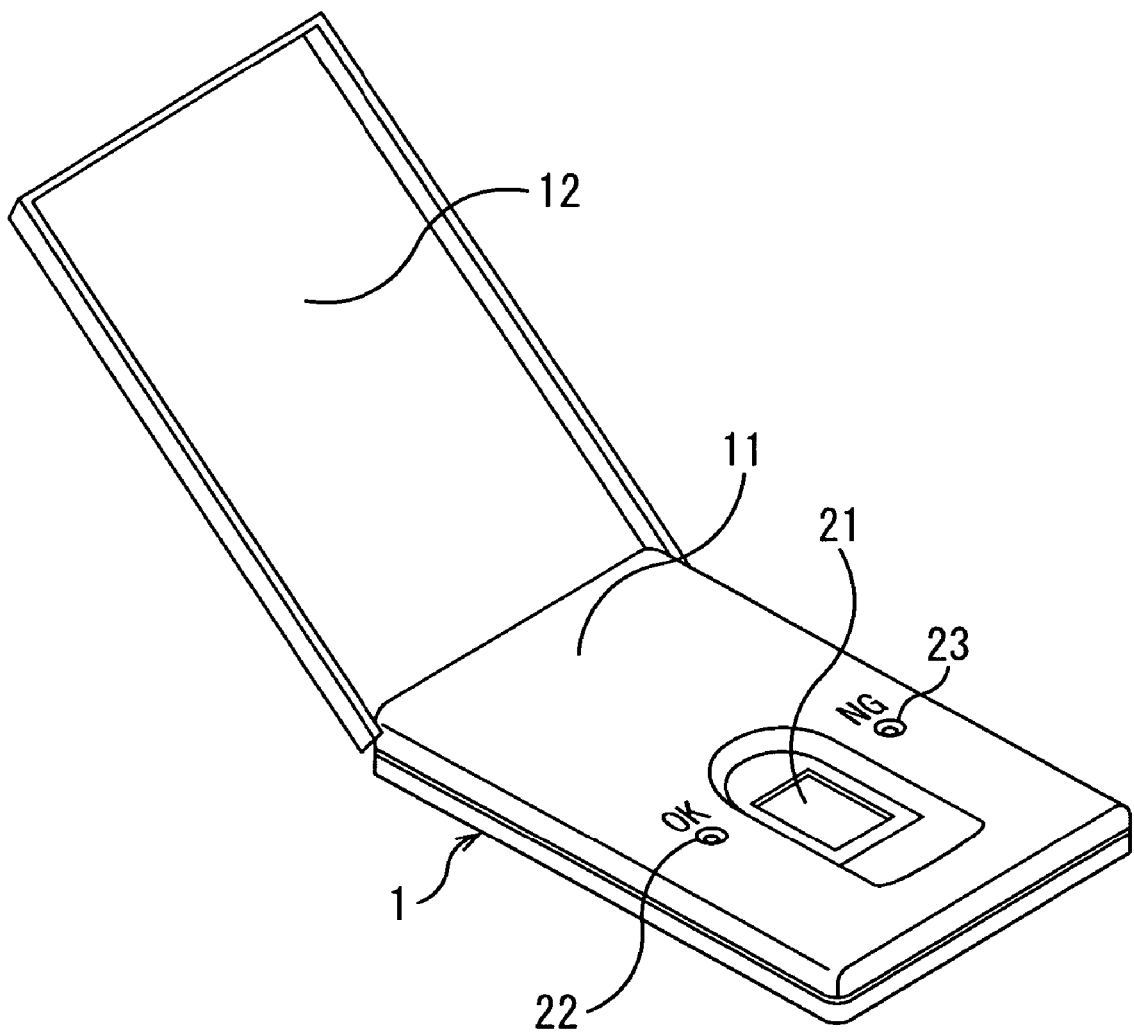
FIG. 1 is a perspective view showing the configuration of an external appearance of one embodiment of a fingerprint collation apparatus to which the present invention is applied.

FIG. 1 is a view showing the configuration of an external appearance of one embodiment of a fingerprint collation apparatus to which the present invention is applied.

A fingerprint collation apparatus 1 includes a body section 11 which constitutes the enclosure of the apparatus, and a protection cover 12 which is provided to freely open/close with respect to the body section 11 and physically protects the top side of the body section 11 when in a closed state. In FIG. 1, the protection cover 12 of the fingerprint collation apparatus 1 is placed in an opened state with respect to the body section 11.

Provided on the top side of the body section 11 are fingerprint reading sensor 21 and lamps 22 and 23 for indicating the result of collation of a fingerprint.

The fingerprint reading sensor 21 reads as an image the fingerprint of a finger which is pressed into contact with the fingerprint reading sensor 21.

Figure 2:
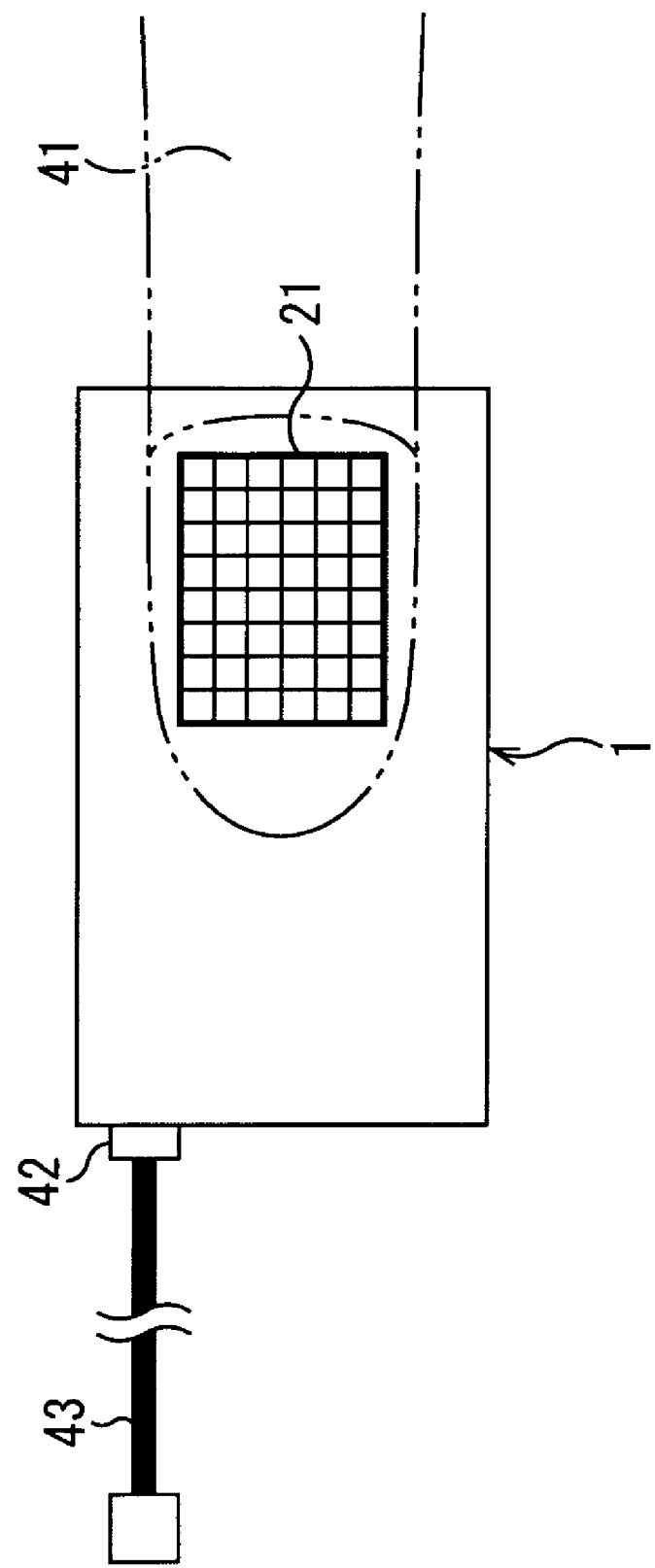
FIG. 2 is a plan view for explaining the situation in which a fingerprint reading sensor is pressed by a finger whose fingerprint is to be read.

In the situation shown in FIG. 1, as shown in FIG. 2, when the fingerprint reading sensor 21 is lightly pressed by a finger 41 having a fingerprint to be read, the finger's fingerprint 41 is read as an image.

The lamp 22 and the lamp 23 are mutually exclusively turned on, thereby indicating whether fingerprint collation is possible. Each of the lamp 22 and the lamp 23, when it is turned off, indicates that the finger 41 is not in contact with the fingerprint reading sensor 21.

The fingerprint collation apparatus 1, as shown in FIG. 2, supplies data indicative of the result of collation of the fingerprint to another apparatus which is not shown, via a cable 43 connected to a terminal 42. The cable 43 may be a cable based on, for example, a USB (Universal Serial Bus) standard. It is a matter of course that the standard of the cable 43 may be another standard such as RS232C.

When this fingerprint collation apparatus 1 is to be carried, the protection cover 12 is closed. Accordingly, the body section 11 and the lamp 22 and 23 for indication, particularly the fingerprint reading sensor 21, is protected from abnormal pressure applied from the outside, as well as from static electricity. Consequently, damage to or destruction of the fingerprint collation apparatus 1 is prevented.

Figure 3:
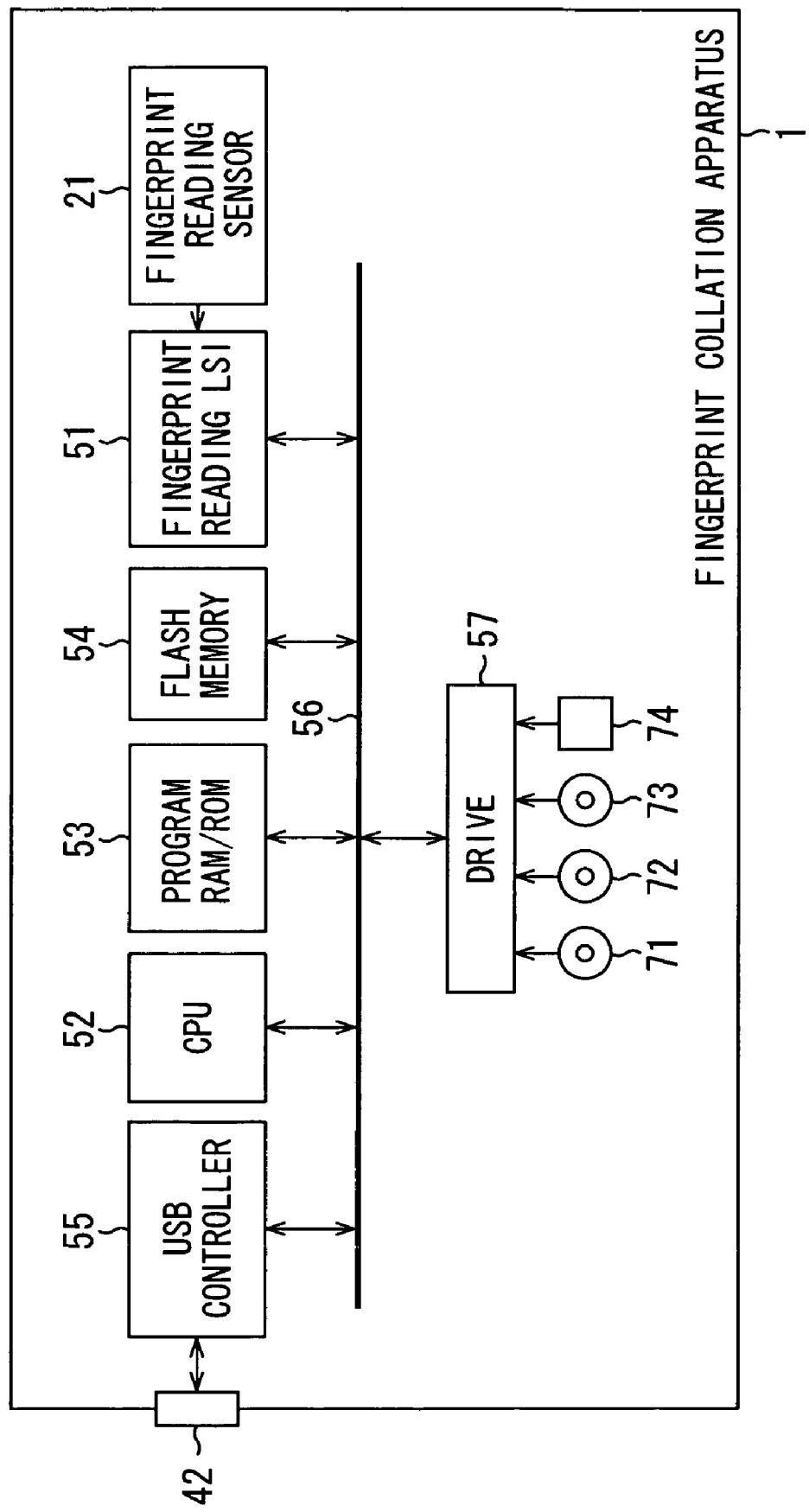
FIG. 3 is a block diagram showing the configuration of the fingerprint collation apparatus.

FIG. 3 is a block diagram showing the internal configuration of the fingerprint collation apparatus 1.

A fingerprint reading LSI (Large Scale Integrated circuit) 51 generates a fingerprint image from a signal supplied from the fingerprint reading sensor 21, and supplies the generated fingerprint image to the CPU 52.

The CPU 52 controls the operation of the entire fingerprint collation apparatus 1. The CPU 52 also registers the fingerprint image supplied from the fingerprint reading LSI 51, or matches the fingerprint image to a fingerprint registered previously.

A program RAM (Random Access Memory)/ROM (Read Only Memory) 53 includes a RAM and a ROM, and stores a fingerprint collation program which is firmware to be executed by the CPU 52. The ROM section of the program RAM/ROM 53 stores a program and parameters which are basically fixed. The RAM section of the program RAM/ROM 53 stores parameters or data which vary according to the execution of the fingerprint collation program.

During registration of the fingerprint of a user, a flash memory 54 stores data indicative of a feature amount extracted from an image of the fingerprint of the user, as a registered template. In other words, during the registration of the fingerprint, the CPU 52 stores into the flash memory 54 a registered template supplied from the fingerprint reading LSI 51 and extracted from the image of the fingerprint. During collation of a fingerprint, the CPU 52 matches an image of a fingerprint supplied from the fingerprint reading LSI 51 to the registered template stored in the flash memory 54.

A USB controller 55 outputs, on the basis of the USB standard, a result of fingerprint collation supplied from the CPU 52, to an external apparatus, which is not shown, connected via the terminal 42, and acquires the ID (Identifier) of the user whose fingerprint is being read, which ID is supplied from the external apparatus. The USB controller 55 supplied the acquired ID of the user to the CPU 52. The user ID is stored in the flash memory 54 as a registered template.

The fingerprint reading LSI 51, the flash memory 54, the program RAM/ROM 53, the CPU 52 and the USB controller 55 are connected to one another by a bus 56.

A drive 57 is connected to the bus 56 as required. The drive 57 reads data or a program recorded on a magnetic disc 71, an optical disc 72, a magneto-optical disc 73 or a semiconductor memory 74 which is loaded as required, and supplies the read data or program to the program RAM/ROM 53 via the bus 56.

The fingerprint reading sensor 21 will be described below. As described above, the fingerprint reading sensor 21 reads a fingerprint image from the finger 41 brought in direct contact with a sensor surface, and can use XXA3271GE made by Sony Corporation.

In the fingerprint reading sensor 21, the sensor surface is formed by disposing an insulation film on the top surface of an array of metal electrodes. When the finger is placed on the sensor surface of the fingerprint reading sensor 21, a capacitor is formed by three constituent elements, i.e., the metal electrodes, the insulation film and the finger 41. In this case, the finger 41 functions as an electrode.

The distance from a ridge section (electrode) of the finger's fingerprint 41 to the metal electrodes of the fingerprint reading sensor 21 is shorter than the distance from a valley section (electrode) of the finger's fingerprint 41 to the metal electrodes of the fingerprint reading sensor 21. In addition, since the ridge section of the finger's fingerprint 41 is brought into contact with the insulation film, the capacitance value of the capacitor formed by the ridge section of the finger's fingerprint 41 is approximately determined by the dielectric constant of the insulation film.

On the other hand, in the valley section of the finger's fingerprint 41, an air layer is inserted between the finger 41 which is an electrode, and the insulation film, whereby the capacitance value of the capacitor formed by the valley section of the finger's fingerprint 41 largely differs from the capacitance value of the capacitor formed by the ridge section of the finger's fingerprint 41.

Accordingly, the fingerprint reading sensor 21 converts to voltages a charge stored in the capacitor formed by the metal electrodes, the insulation film and the ridge section of the finger's fingerprint 41 and a charge stored in the capacitor formed by the metal electrodes, the insulation film and the valley section of the finger 41, thereby outputting the unevenness of the fingerprint as an electrical signal.

Figure 4:
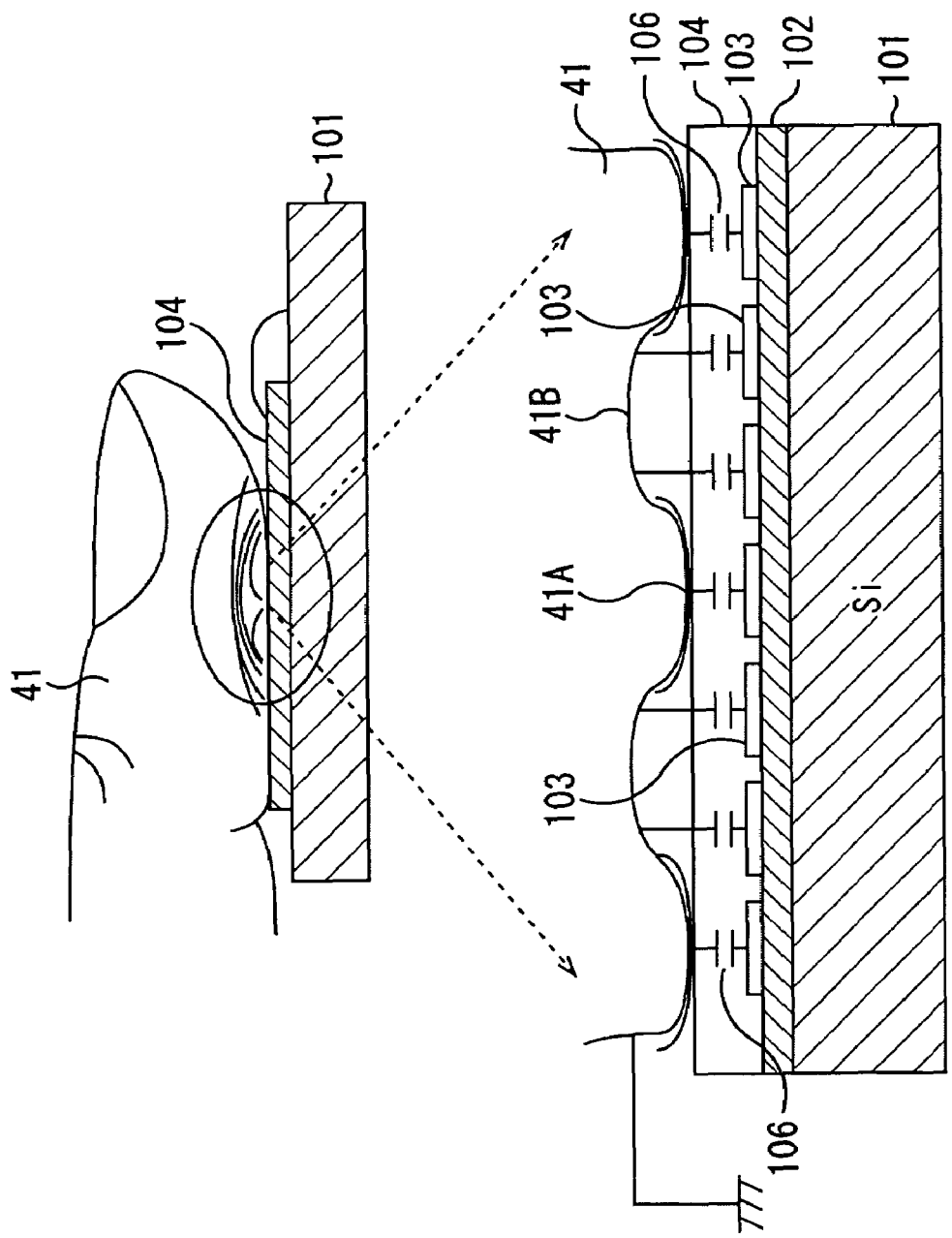
FIG. 4 is a cross-sectional view showing a theoretical configuration of the fingerprint reading sensor.

FIG. 4 is a view showing a configuration showing a principle of the fingerprint reading sensor 21.

As shown in FIG. 4, the fingerprint reading sensor 21 has a configuration in which metal electrodes 103 (sampling points) are arranged in an array of pitch 80 μm on a silicon (Si) substrate 101 with an interlayer film 102 interposed therebetween, and the top surface of the array is covered with an insulation film (Over Coat) 104. The fingerprint reading sensor 21 detects the unevenness of the finger's fingerprint 41 which is directly placed on the top surface of the insulation film 104.

In other words, because the finger 41 is a conductor, capacitors 106 are formed by the metal electrodes 103, the insulation film 104 and the finger 41 when the finger 41 is placed on the top surface of the insulation film 104. Thus, the capacitors 106 which have different distances from the finger 41 to the metal electrodes 103 are formed according to the unevenness of a ridge section 41A and a valley section 41B of the fingerprint, so that the unevenness of the ridge section 41A and the valley section 41B appears as the difference between the capacitance values of the capacitors 106.

In addition, since the ridge section 41A of the fingerprint is in contact with the insulation film 104, the capacitance values of the respective capacitors 106 formed by the ridge section 41A are determined by the dielectric constant of the insulation film 104 and the thickness of the insulation film 104. On the other hand, in the valley section 41B of the fingerprint, an air layer, in addition to the insulation film 104, is inserted between the finger 41 which is an electrode, and the metal electrodes 103, whereby the capacitance values of the respective capacitors 106 formed by the valley section 41B are determined by the dielectric constant of the insulation film 104 and the thickness of the insulation film 104 as well as the dielectric constant and the thickness of air.

In other words, the capacitance values of the respective capacitors 106 formed by the valley section 41B of the finger's fingerprint 41 largely differ from the capacitance values of the respective capacitors 106 formed by the ridge section 41A of the finger's fingerprint 41.

Accordingly, when the finger 41 is in contact with the top surface (sensor surface) of the fingerprint reading sensor 21, if a constant voltage is applied to the metal electrodes 103, the amount of charge stored in each of the capacitors 106 of the ridge section 41A of the finger 41 differs from the amount of charge stored in each of the capacitors 106 of the valley section 41B. The fingerprint reading sensor 21 converts the charges stored in the respective capacitors 106 to voltages, and outputs the unevenness of the fingerprint as an electrical signal.

Figure 5:
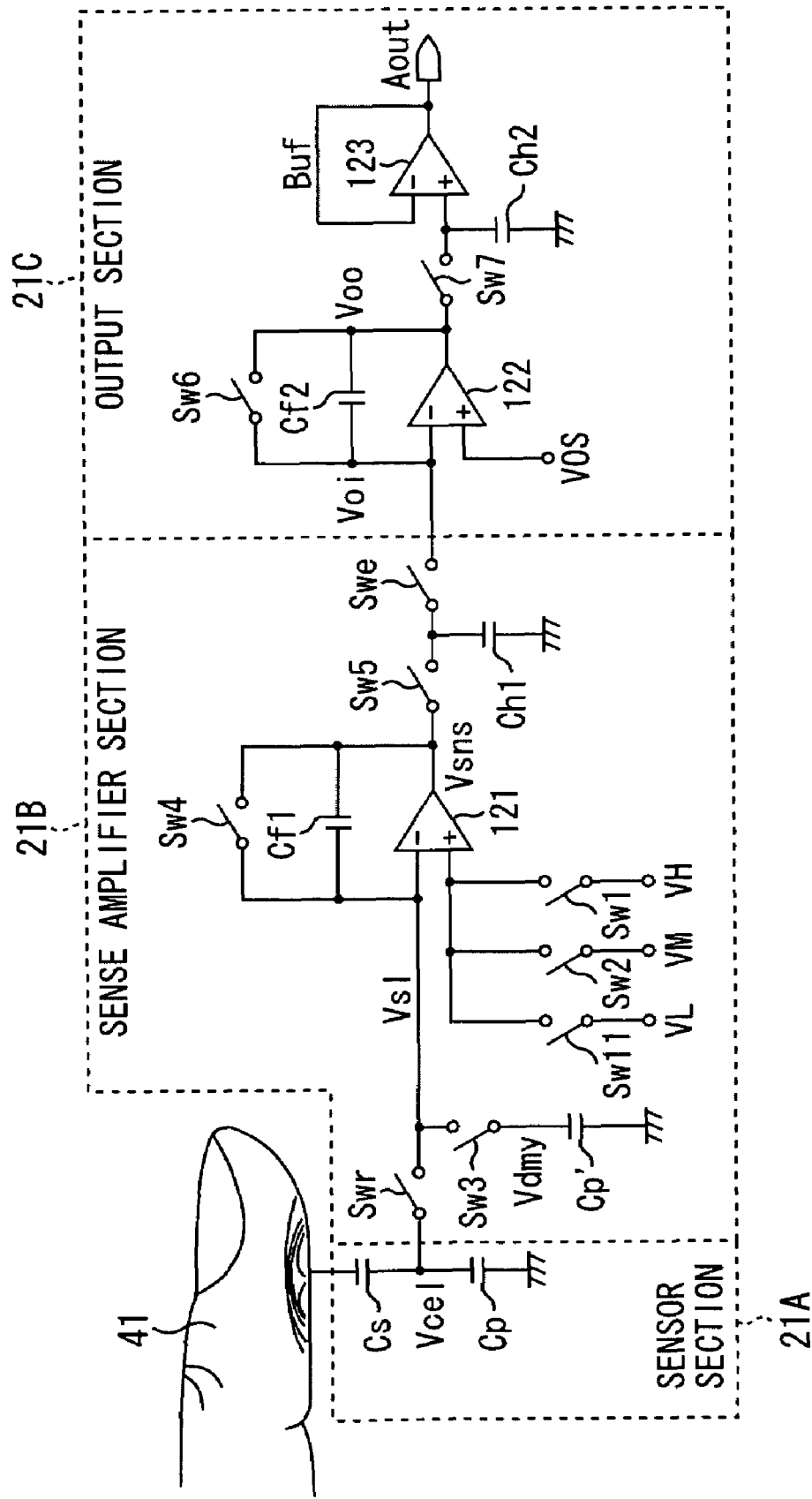
FIG. 5 is a circuit diagram showing the configuration of an internal circuit of the fingerprint reading sensor.

The operation of the fingerprint reading sensor 21 which converts the unevenness of the fingerprint as an electrical signal will be described below. FIG. 5 is a circuit diagram showing an internal circuit of the fingerprint reading sensor 21.

The fingerprint reading sensor 21 includes a sensor section 21A which detects as a charge a capacitance value based on the unevenness of the fingerprint, a sense amplifier section 21B which converts the charge outputted from the sensor section 21A, and an output section 21C which amplifies and outputs the voltage signal outputted from the sense amplifier section 21B.

In the fingerprint reading sensor 21, the sense amplifier section 21B has a differential amplifier 121 for converting a charge to a voltage signal, and the output section 21C has a differential amplifier 122 for amplifying the voltage signal and a differential amplifier 123 for adjusting output impedance.

In addition, in FIG. 5, a capacitor Cs denotes any of the capacitors 106 formed between the finger 41 and the metal electrodes 103. The capacitance of the capacitor Cs is hereinafter referred to simply as Cs.

A capacitor Cp of the sensor section 21A is a capacitor equivalent to a parasitic capacitance formed between the metal electrodes 103 and the display panel 101. The capacitance of the capacitor Cp is hereinafter referred to simply as Cp. The capacitor Cs and the capacitor Cp of the sensor section 21A are connected in series. The voltage at the point of connection between the capacitor Cs and the capacitor Cp is referred to as Vcel.

A capacitor Cp' of the sense amplifier section 21B is a capacitance for canceling the capacitance of the capacitor Cp due to parasitic capacitance. One of the terminals of the capacitor Cp' is grounded, while the other terminal of the capacitor Cp' is connected to the inverting input terminal of the differential amplifier 121 via a switch Sw3. The capacitance of the capacitor Cp' is hereinafter referred to simply as CP'. The capacitance of the capacitor Cp' is approximately equal to the capacitance of the capacitor Cp.

One of the terminals of a capacitor Ch1 of the sense amplifier section 21B is grounded, while the other terminal of the capacitor Ch1 is connected to the output terminal of the differential amplifier 121 via a switch Sw5 and is also connected to the inverting input terminal of the differential amplifier 122 via a switch Swe. One of the terminals of a capacitor Ch2 of the output section 21C is grounded, while the other terminal of the capacitor Ch2 is connected to the output terminal of the differential amplifier 122 via a switch Sw7 and is also connected to the non-inverting input terminal of the differential amplifier 123. The capacitor Ch1 of the sense amplifier section 21B and the capacitor Ch2 of the output section 21C are so-called hold capacitors for holding voltages.

The capacitance of the capacitor Ch1 is hereinafter referred to as Ch1. The capacitance of the capacitor Ch2 is hereinafter referred to as Ch2.

In addition, one of the terminals of a capacitor Cf1 of the sense amplifier section 21B is connected to the inverting input terminal of the differential amplifier 121, while the other terminal of the capacitor Cf1 is connected to the output terminal of the differential amplifier 121. The capacitance of the capacitor Cf1 is a feedback capacitance which determines the gain of the differential amplifier 121.

The capacitance of the capacitor Cf1 is hereinafter referred to simply as Cf1.

One of the terminals of a capacitor Cf2 of the output section 21C is connected to the non-inverting input terminal of the differential amplifier 122, while the other terminal of the capacitor Cf2 is connected to the output terminal of the differential amplifier 122. The capacitance of the capacitor Cf2 is a feedback capacitance which determines the gain of the differential amplifier 122. The capacitance of the capacitor Cf2 is hereinafter referred to simply as Cf2.

A switch Swr of the sense amplifier section 21B connects or disconnects the point of connection between the capacitor Cs and the capacitor Cp and the non-inverting input terminal of the differential amplifier 121. The switch Swe of the sense amplifier section 21B connects or disconnects the ungrounded terminal of the capacitor Ch1 and the non-inverting input terminal of the differential amplifier 122.

In the sense amplifier section 21B, a voltage VH is applied to one of the terminals of a switch Sw1, while the other terminal is connected to the non-inverting input terminal of the differential amplifier 121. A voltage VM is applied to one of the terminals of a switch Sw2, while the other terminal is connected to the non-inverting input terminal of the differential amplifier 121. A voltage VL is applied to one of the terminals of a switch Sw11, while the other terminal is connected to the non-inverting input terminal of the differential amplifier 121.

The voltage VH is higher than the voltage VM, and the voltage VM is higher than the voltage VL. The difference between the voltage VH and the voltage VM is nearly equal to the difference between the voltage VM and the voltage VL.

One of the terminals of the switch Sw3 is connected to the ungrounded terminal of the capacitor Cp', while the other terminal of the switch Sw3 is connected to the non-inverting input terminal of the differential amplifier 121.

One of the terminals of a switch Sw4 is connected to one of the terminals of the capacitor Cf1, while the other terminal of the switch Sw4 is connected to the other terminal of the capacitor Cf1. In other words, the switch Sw4 is connected in parallel with the capacitor Cf1.

One of the terminals of a switch Sw5 is connected to the output terminal of the differential amplifier 121, while the other terminal of the switch Sw5 is connected to the ungrounded terminal of the capacitor Ch1 and is also connected to the non-inverting input terminal of the differential amplifier 122 via the switch Swe.

One of the terminals of a switch Sw6 of the output section 21C is connected to one of the terminals of the capacitor Cf2, while the other terminal of the switch Sw6 is connected to the other terminal of the capacitor Cf2. In other words, the switch Sw6 is connected in parallel with the capacitor Cf2.

One of the terminals of a switch Sw7 of the output section 21C is connected to the output terminal of the differential amplifier 122, while the other terminal of the switch Sw7 is connected to the ungrounded terminal of the capacitor Ch2 and is also connected to the non-inverting input terminal of the differential amplifier 123.

A voltage VOS is applied to the non-inverting input terminal of the differential amplifier 122.

The operation of the internal circuit of the fingerprint reading sensor 21 will be described below.

The operation of the fingerprint reading sensor 21 is started when the switch Swr, the switch Swe, the switch Sw1 and the switch Sw7 as well as the switch Sw11 are open, i.e., off.

(1) First, from among the switch Swr, the switch Swe, the switch Sw1 and the switch Sw7 as well as the switch Sw11 each of which is in its initial status, i.e., off, the switch Sw1, the switch Sw4 and the switch Swr are closed, i.e., turned on. Accordingly, the voltage Vcel at the point of connection between the capacitor Cs and the capacitor Cp is set to VH. At this time, the charge stored in each of the capacitor Cs and the capacitor Cp becomes (Cs+Cp) VH.

(2) After that, the switch Sw1 and the switch Swr are turned off.

(3) Then, the switch Sw11 and the switch Sw3 are turned on, so that a voltage Vdmy at the point of connection between the capacitor Cp' and the switch Sw3 is set to VL. At this time, the charge stored in the capacitor Cp' becomes Cp'VL.

(4) After that, the switch Sw3 and the switch Sw11 are turned off.

(5) Then, the switch Sw2 is turned on, so that a voltage Vs1 applied to the non-inverting input terminal of the differential amplifier 121 is set to VM.

(6) After that, the switch Sw4 is turned off.

(7) Then, the switch Swr, the switch Sw3 and the switch Sw5 are turned on. At this time, the voltage Vcel is VH, the voltage Vdmy is VL, and the voltage Vs1 applied to the non-inverting input terminal of the differential amplifier 121 is VM. Accordingly, a charge which is expressed by expression (1) moves among the capacitor Cs, the capacitor Cp and the capacitor Cp':

$$(Cs+Cp)(VH-VM)-Cp'(VM-VL) \approx Cs(VH-VM) \quad (1)$$

Accordingly, an output voltage Vsns of the differential amplifier 121 is expressed by expression (2):

$$Vsns = VM - Cs(VH-VM)/Cf1 \quad (2)$$

In this manner, the gain of the sense amplifier section 21B is determined without depending on the parasitic capacitance Cp formed between the metal electrode 103 and the display panel 101, whereby the dynamic range can be increased.

Then, the voltage Vsns found by expression (2) is applied to the capacitor Ch1.

(8) After that, the switch Sw5 is turned off.

(9) Then, the switch Sw6 is turned off, and a voltage Voi on the input side of the capacitor Cf2 (on the non-inverting input terminal side of the differential amplifier 122) is set to VOS.

(10) After that, the switch Sw6 is turned off.

(11) Then, the switch Swe and the switch Sw7 are turned on. A charge which moves from the capacitor Ch1 to the capacitor Cf2 at this time is (VOS-Vsns) Ch1. Accordingly, a voltage Voo on the output side of the capacitor Cf2 (on the output terminal side of the differential amplifier 122) is determined, and a charge is stored in the capacitor Ch2.

Then, this voltage Voo is outputted to an output terminal Aout via the differential amplifier 123 which is a buffer amplifier.

Fingerprint registration processing in the fingerprint collation apparatus 1 shown in FIG. 1 will be described below with reference to the flowcharts of FIGS. 6 and 7. This processing is started when a command to start fingerprint registration processing is entered by the user and the finger of the user is pressed on the fingerprint reading sensor 21.

In step S1, the fingerprint reading sensor 21 reads an image of the finger's fingerprint pressed in contact with the fingerprint reading sensor 21. Then, a signal corresponding to the read fingerprint is supplied to the fingerprint reading LSI 51.

In step S2, the fingerprint reading LSI 51 generates image data of the fingerprint from the signal corresponding to the fingerprint supplied from the fingerprint reading sensor 21.

Figure 8:
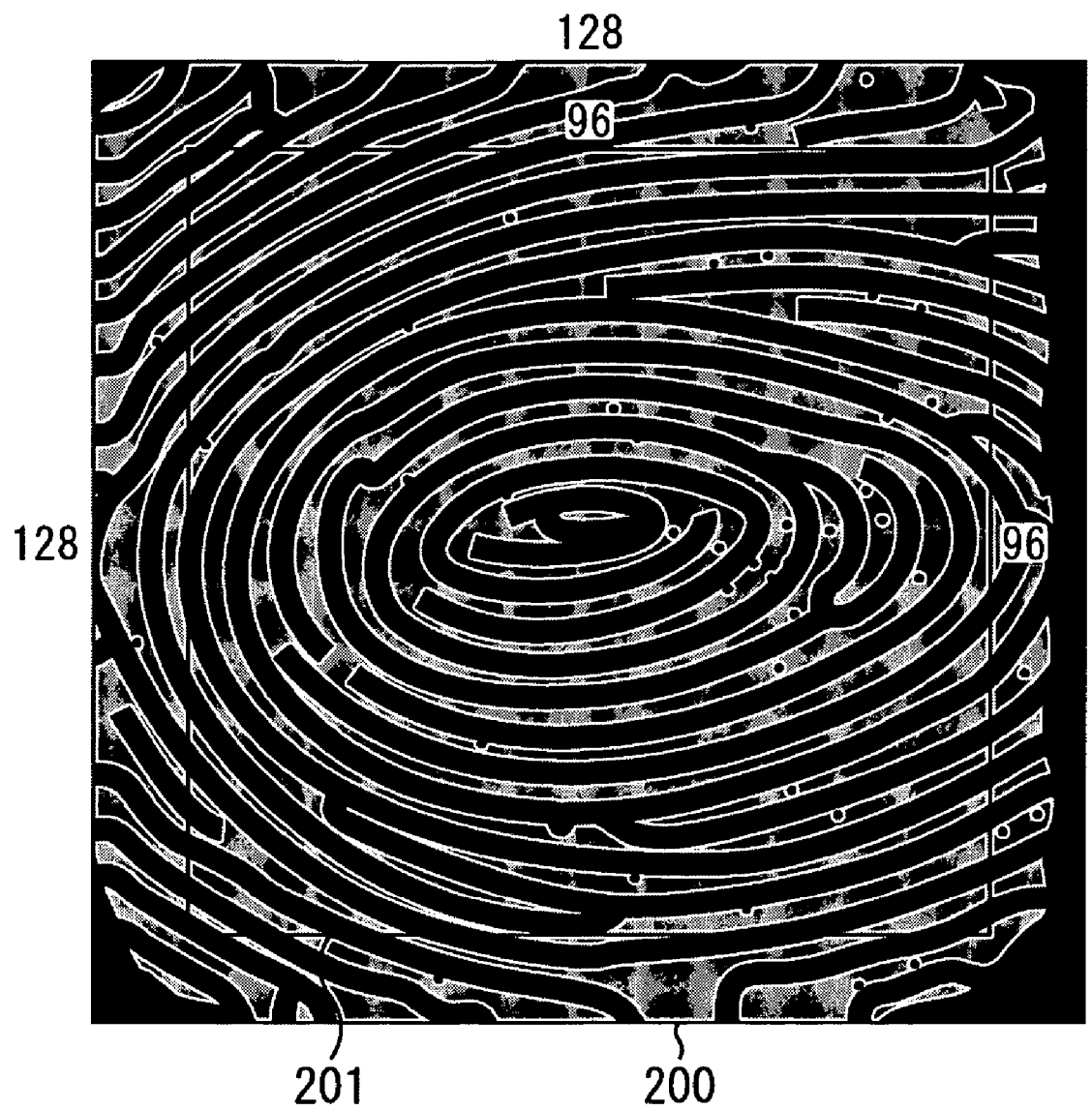
FIG. 8 is a view showing an image example according to step S3 of FIG. 6.

In step S3, the fingerprint reading LSI 51 converts the generated image data of the fingerprint to 256-level gray image data, and supplies the converted 256-level gray image data to the CPU 52. Specifically, data indicative of an image 200 having 128 pixels×128 pixels as shown in FIG. 8 is acquired. An image 201 is an image having 96 pixels×96 pixels in the image 200.

Figure 9:
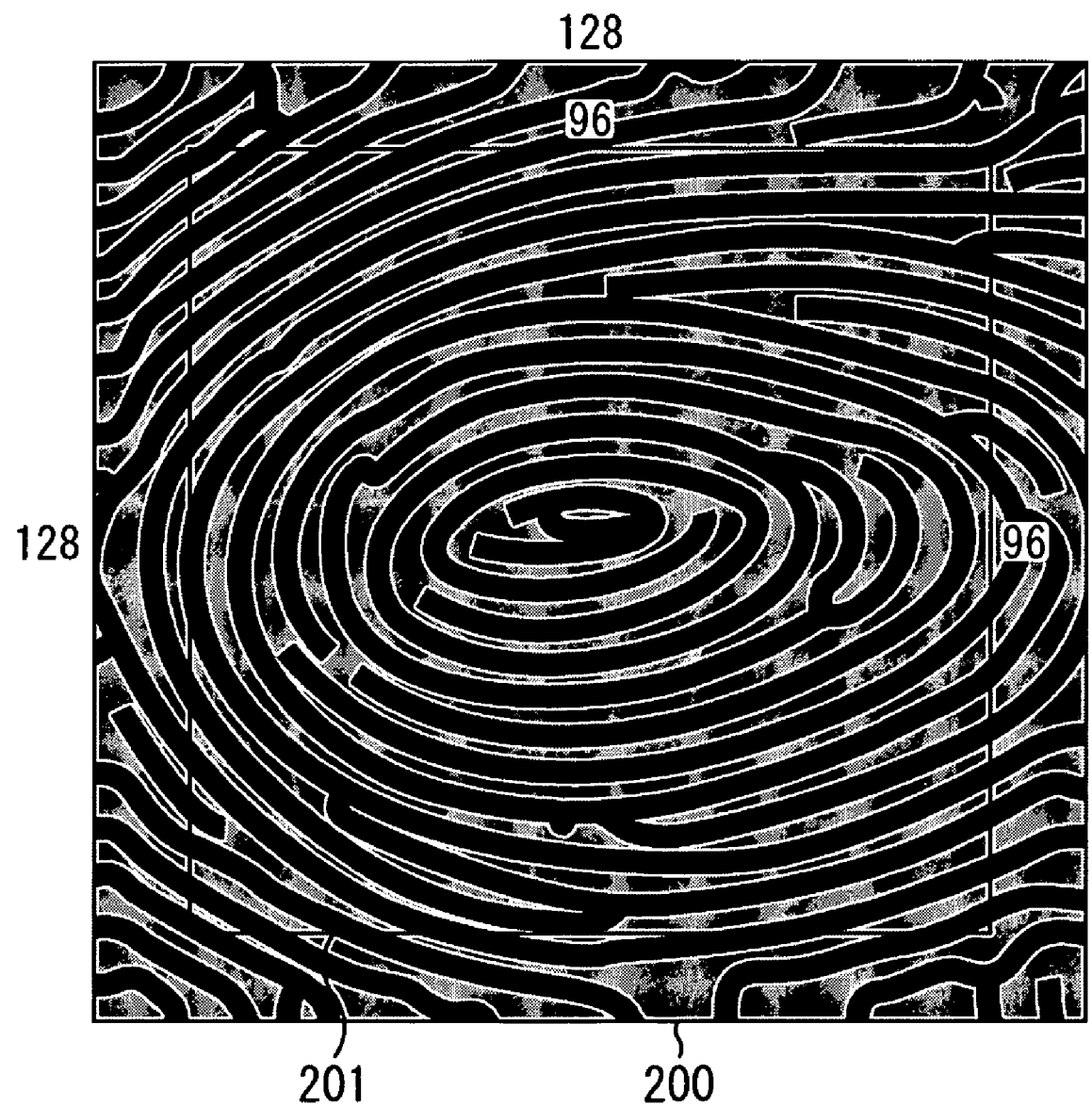
FIG. 9 is a view showing an image example according to step S4 of FIG. 6.

In step S4, the CPU 52 executes preprocessing, such as noise reduction and filling up small injuries in fingerprint ridges, on the converted gray image data. An image from which noise is reduced as shown in FIG. 9 is obtained as a preprocessed image.

Figure 10:
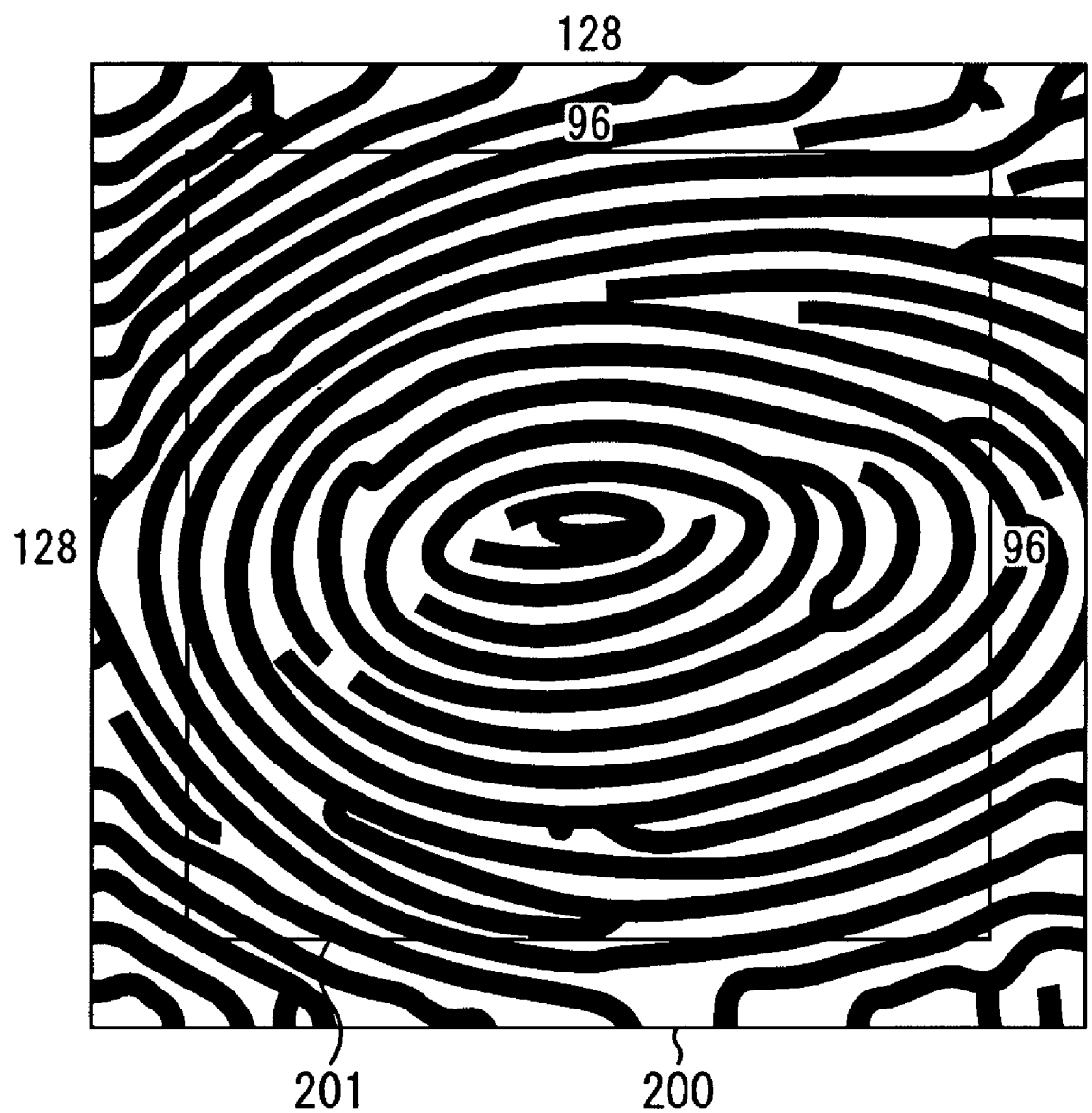
FIG. 10 is a view showing an image example according to step S5 of FIG. 6.

In step S5, the CPU 52 binarizes the preprocessed gray image data with a predetermined threshold and converts the preprocessed gray image data to binarized image data. FIG. 10 shows the binarized image.

Figure 11:
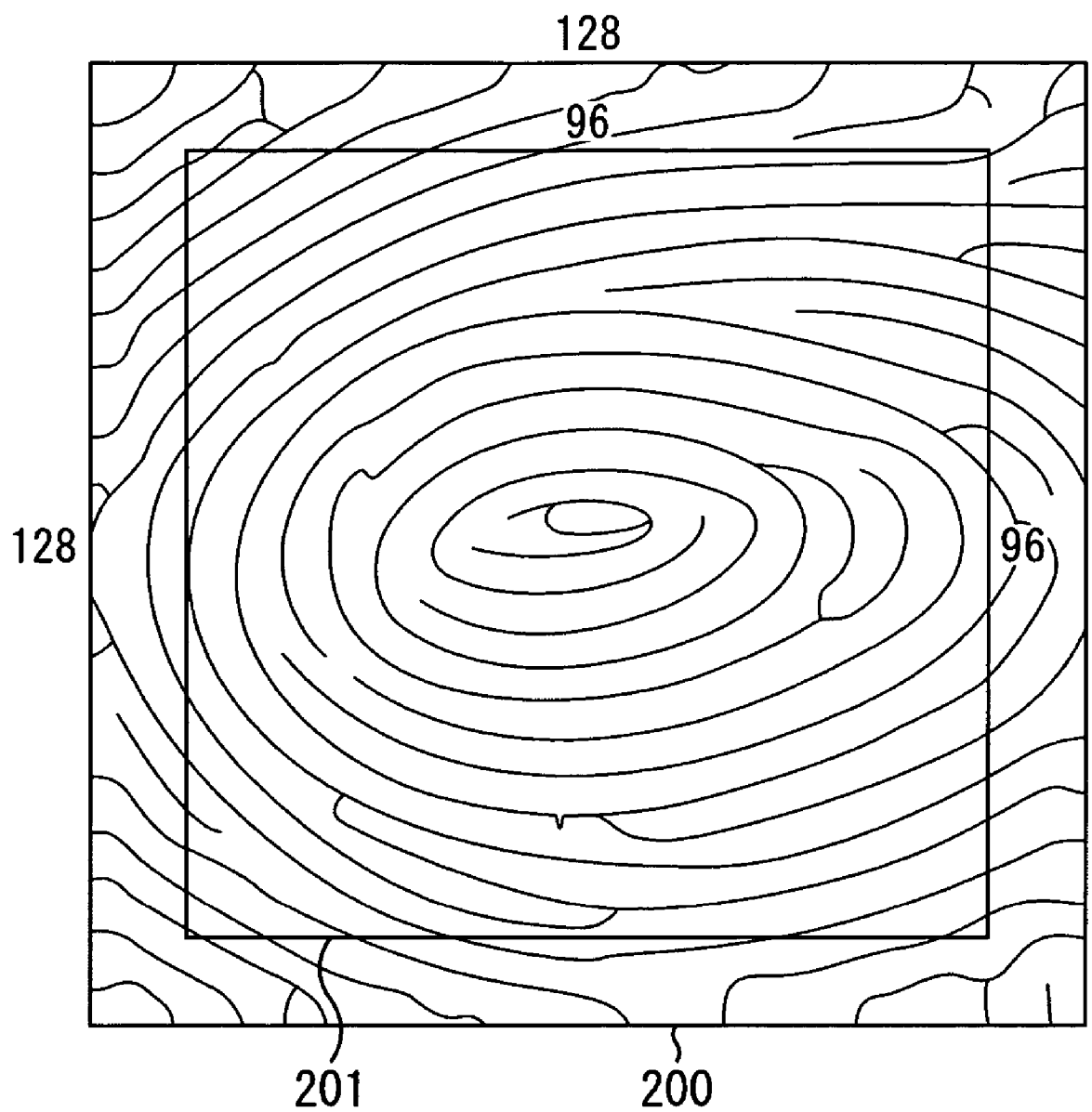
FIG. 11 is a view showing an image example according to step S6 of FIG. 6.

In step S6, the CPU 52 performs thinning processing. Specifically, the CPU 52 performs the processing of extracting center lines each having a line width equivalent to one pixel, from sections represented by values of 1 in the binarized image data obtained by the processing of step S5. Accordingly, each of the line widths becomes equivalent to one pixel and connectivity is retained, whereby ridge bifurcations and ridge endings of fingerprint ridges become easy to detect in the subsequent step. The image which is thinned by the thinning processing of step S6 is as shown in FIG. 11.

Figure 12:
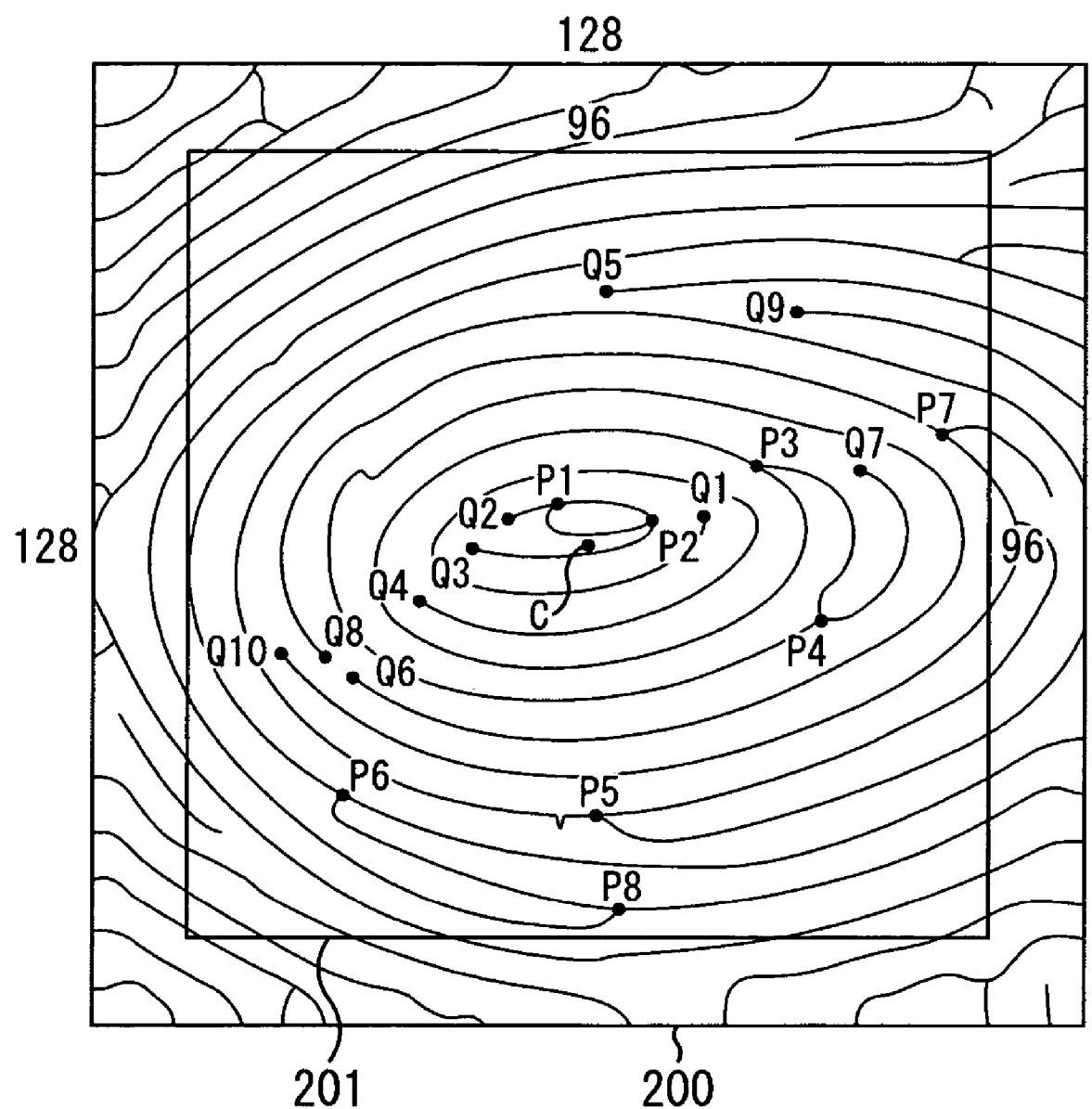
FIG. 12 is a view showing an image example according to step S7 of FIG. 6.

In step S7, the CPU 52 detects a maximum of 10 ridge bifurcations and a maximum of 10 ridge endings from the thinned image. The ridge bifurcations and the ridge endings detected by the processing of step S7 are as shown in FIG. 12. The ridge bifurcations and the ridge endings are actually detected from the image 201 represented by 96 pixels×96 pixels in the image 200 represented by 128 pixels×128 pixels in FIG. 12. In this manner, it is possible to decrease the number of ridge bifurcations and ridge endings to be extracted. In FIG. 12, ridge bifurcations P1 to P8 (eight) are detected, and the coordinates of the respective ridge bifurcations P1 to P8 are P1 (xp1, yp1), P2 (xp2, yp2), P3 (xp3, yp3), P4 (xp4, yp4), P5 (xp5, yp5), P6 (xp6, yp6), P7 (xp7, yp7) and P8 (xp8, yp8). In addition, ridge endings Q1 to Q10 (ten) are detected, and the coordinates of the respective ridge endings Q1 to Q10 are Q1(xq1, yq1), Q2(xq2, yq2), Q3(xq3, yq3), Q4(xq4, yq4), Q5(xq5, yq5), Q6(xq6, yq6), Q7(xq7, yq7), Q8(xq8, yq8), Q9(xq9, yq9) and Q8(xq10, yq10).

In this example, the CPU 52 detects a maximum of 10 ridge bifurcations and a maximum of 10 ridge endings, but this example is not limitative. For example, each of the numbers of ridge bifurcations and ridge endings to be detected may be set to a maximum limit determined in advance, or to 10 or more. In addition, the CPU 52 detects the ridge bifurcations and the ridge endings from the image 201 represented by 96 pixels×96 pixels, but this example is not limitative. For example, an image formed by 112 pixels×112 pixels may also be used.

In step S8, the CPU 52 causes the RAM section of the program RAM/ROM 53 to store the coordinates (x, y) of the detected ridge bifurcations and ridge endings (in other words, Pi(xpi, ypi) (where i=1, 2, ..., 8), and Qi (xqi, yqi) (where i=1, 2, ..., 10)). Since this storage is temporary, the coordinates are stored in the RAM section of the program RAM/ROM 53 (not in the flash memory 54).

In step S9, the CPU 52 detects a center point C (in, jn) which is the center of the registered image. Specifically, as shown in FIG. 12, the point where the center line of the vertical axis of the image 201 intersects the center line of the horizontal axis of the same is determined as the center point. The center found in this step is not the center of the fingerprint but the center of the registered image, so that the center can be found quickly and easily. In the case of this example, since the image 200 is represented by 128 pixels×128 pixels, the CPU 52 detects a preset point (64, 64) (or (63, 63)) as the center point C.

In step S10, the CPU 52 calculates the distance between the center point C (in, jn) found by the processing of step S9, which is the center of the registered image, and each of the plurality of ridge bifurcations detected by the processing of step S7. In the case of this example, the distances between the center point C and the ridge bifurcations P1 to P8 are respectively calculated. If the distance between the center point C and the ridge bifurcation P1 is calculated as Lp1, the distance between the center point C and the ridge bifurcation P2 is calculated as Lp2, and the distance between the center point C and the ridge bifurcation P3 is calculated as Lp3. Subsequently, the respective distances between the center point C and P4, P5, ..., P8 are sequentially calculated as Lp4, Lp5, ..., Lp8.

In step S11, the CPU 52 sorts the distances calculated by the processing of step S10 (the distances between the center point C and the respective ridge bifurcations P1 to P8) in increasing order. In the case of this example, the distances from the center are sorted to be $Lp1<Lp2<Lp3<Lp4<Lp5<Lp6<Lp7<Lp8$.

In step S12, the CPU 52 calculates the distance between the center point C (in, jn) and each of the plurality of ridge endings detected by the processing of step S7. In the case of this example, the respective distances between the center point C and the ridge endings Q1 to Q10 are calculated. If the distance between the center point C and the ridge ending Q1 is calculated as Lq1, the distance between the center point C and the ridge ending Q2 is calculated as Lq2, and the distance between the center point C and the ridge ending Q3 is calculated as Lq3. Subsequently, the respective distances between the center point C and Q4, Q5, . . . , Q10 are sequentially calculated as Lq4, Lq5, . . . , Lq10.

In step S13, the CPU 52 sorts the distances calculated by the processing of step S12 (the distances between the center point C and the respective ridge endings Q1 to Q10) in increasing order. In the case of this example, the distances from the center are sorted to be $Lq1<Lq2<Lq3<Lq4<Lq5<Lq6<Lq7<Lq8<Lq9<Lq10$.

In step S14, the CPU 52 generates all triangles each connecting three points closest to one another among the ridge bifurcations (in the case of this example, a maximum of 10 ridge bifurcations) which are close to the center point C (in, jn) of the fingerprint (the central point found by the processing of step S9). As mentioned above, in the case of this example, the CPU 52 generates all triangles each connecting three points closest to one another among the maximum of 10 ridge bifurcations close to the center point of the fingerprint. However, this example is not limitative, and can also be modified according to the number of ridge bifurcations detected by the processing of step S7.

Figure 13:
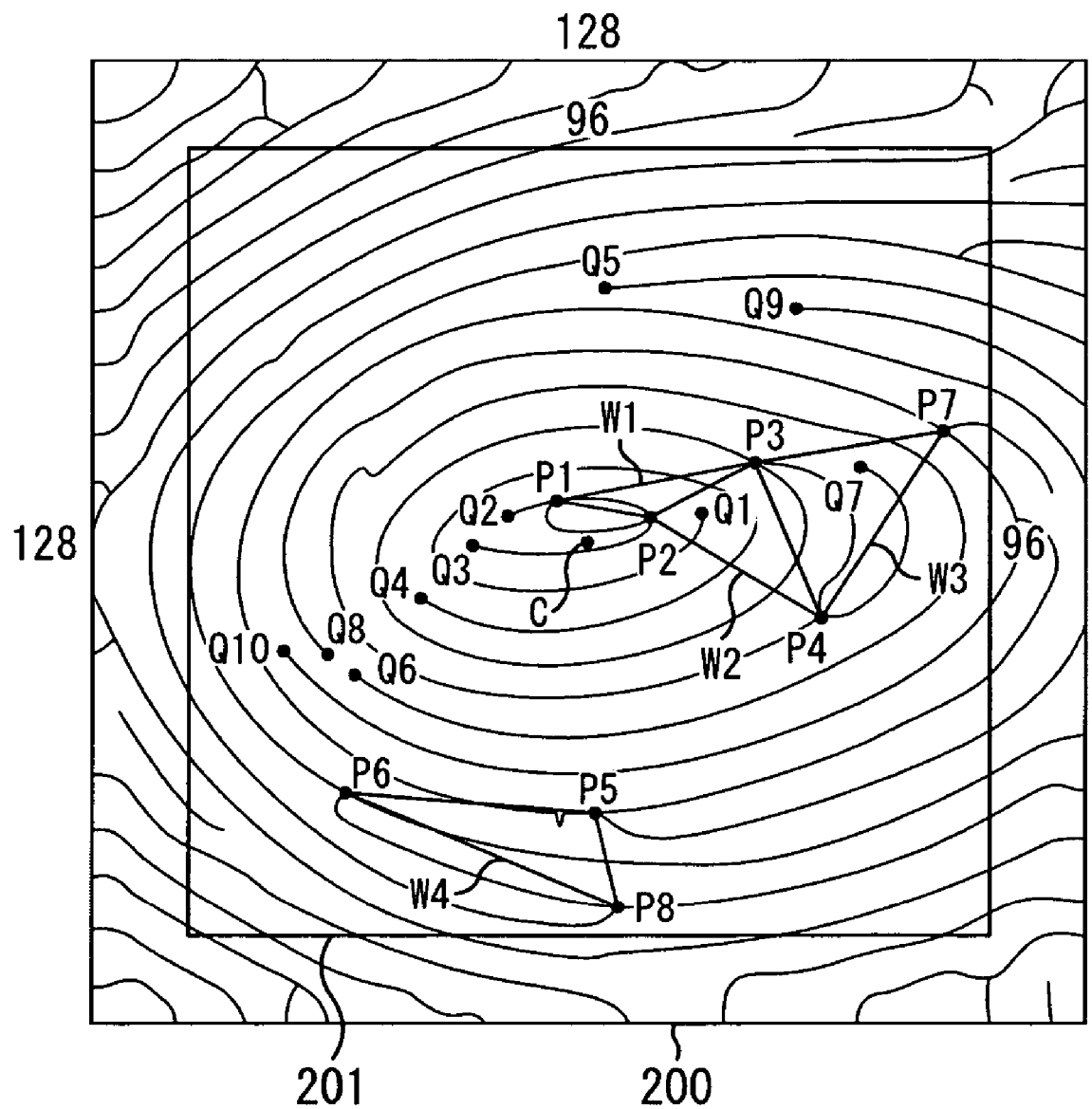
FIG. 13 is a view showing an image example according to step S14 of FIG. 7.

Specifically, the CPU 52 generates a triangle W1 as shown in FIG. 13 by connecting the ridge bifurcation P1 (xp1, yp1) closest to the center point C (in, jn) (the ridge bifurcation P1 is selected because the distance Lp1 from the center point C is smallest) and two ridge bifurcations P2 (xp2, yp2) and P3 (xp3, yp3) closest to the ridge bifurcation P1.

After that, the CPU 52 generates a triangle by connecting the ridge bifurcation P2 (xp2, yp2) second closest to the center point C (the ridge bifurcation P2 is selected because the distance Lp2 from the center point C is the second smallest) and two ridge bifurcations P1 (xp1, yp1) and P3 (xp3, yp3) closest to the ridge bifurcation P2. In the case of this example, this triangle is completely the same as the above-mentioned triangle W1. In the following description, if completely the same triangle is generated, the description thereof is omitted.

By sequentially repeating this process, a triangle W2 which connects the ridge bifurcation P3 third closest to the center point C and two ridge bifurcations P2 and P4 closest to the ridge bifurcation P3, a triangle W3 which connects the ridge bifurcation P4 fourth closest to the center point C and two ridge bifurcations P3 and P7 closest the ridge bifurcation P4, and a triangle W4 which connects the ridge bifurcation P5 fifth closest to the center point C and two ridge bifurcations P6 and P8 closest to the p5, are also generated, whereby a total of four triangles are generated. (The illustration of triangles which are respectively generated on the basis of the ridge bifurcation P6 sixth closest to the center point C, the ridge bifurcation P7 seventh closest to the center point C, and the ridge bifurcation P8 eighth closest to the center point C is omitted, because each of the triangles is superposed on any of the above-mentioned triangles W1, W2, W3 and W4.)

By generating each of the triangles in this manner on the basis of the corresponding one of the ridge bifurcations and two ridge bifurcations closest to the corresponding one in order of increasing distance from the center, there may occur a case where, for example, the first triangle and the second triangle or the third triangle are formed by completely the same ridge bifurcations. This fact indicates that each of the triangles is generated on the basis of the corresponding one of the ridge bifurcations and two ridge bifurcations closest to the corresponding one in order from the ridge bifurcation closest to the center. Specifically, the triangle W1 generated by connecting the ridge bifurcation P1 (xp1, yp1) closest to the center point C (in, jn) and the two ridge bifurcations P2 (xp2, yp2) and P3 (xp3, yp3) closest to the ridge bifurcation P1, and the triangle generated by connecting the ridge bifurcation P2 (xp2, yp) second closest to the center point C and the two ridge bifurcations P1 (xp1, yp1) and P3 (xp3, yp3) closest to the ridge bifurcation P2 are each completely the same as the triangle W1, and these triangles can also be generated without omission.

In step S15, the CPU 52 calculates an area and a length of each side of each of the generated triangles. In the case of this example, the number of the generated triangles is four (the triangles W1, W2, W3 and W4). (Actually, since superposed triangles are generated, four triangles or more are formed, but in the case of this example, the number of different triangles is four.) As a result, the area and the length of each side of each of the four triangles are calculated. Accordingly, as to the triangle W1, an area S1 of the triangle W1, the distance between the ridge bifurcation P1 and the ridge bifurcation P2 (this distance and other similar are hereinafter abbreviated as P1P2 and the like), the P2P3 distance and the P3P1 distance are calculated. As to the triangle W2, an area S2 of the triangle W2, the P2P3 distance, the P3P4 distance and the P4P2 distance are calculated. As to the triangle W3, an area S3 of the triangle W3, the P3P4 distance, the P4P7 distance, and the P7P3 distance are calculated. As to the triangle W4, an area S4 of the triangle W4, the P5P6 distance, the P6P8 distance, and the P8P5 distance (the length of each side) are calculated.

In step S16, the CPU 52 causes the flash memory 54 to store the area and the length of each side of each of the triangles as a registered template. Since the registered template is a set of the areas and the lengths of the sides, the amount of data of the registered template is small.

In step S17, the CPU 52 calculates the positions of ridge endings closest to the three points of each of the triangles. Specifically, in the case of FIG. 13, since the ridge bifurcations which constitute the triangle W1 are the ridge bifurcation P1, P2 and P3, the CPU 52 detects the ridge ending Q2 (xq2, yq2) closest to the ridge bifurcation P1, the ridge ending Q1 (xq1, yq1) closest to the ridge bifurcation P2, and the ridge ending Q1 (xq1, yq1) closest to the ridge bifurcation P3, and calculates their directions and distances (the direction and the distance of P1Q2, the direction and the distance of P2Q1, and the direction and the distance of P3Q1). In the case of this example, a distance and a position are found as a position, but at least either one may be found as a position. When this process is repeated, the directions and distances (hereinafter referred to also as positions) of P3Q1, P2Q1 and P4Q7 are found as to the triangle W2, the P3Q1, P4Q7 and P7Q7 positions are found as to the triangle W3, and the P5Q6, P6Q6 and P8Q6 positions are found as to the triangle W4.

In step S18, the CPU 52 associates the positions of the ridge endings found for each of the triangles by the processing of step S17 with the area and the length of each side of the corresponding one of the triangles (the area and the length of each side of each of the triangles stored by the processing of step S16), and causes the flash memory 54 to store the associated data a registered template. In the case of this example, as to each of the triangles W1, W2, W3 and w4, the length of each of the (three) sides (for example, in the case of W1, the P1P2 length, the P2P3 length, and the P3P1 length), and the positions of each of the ridge endings (in the case of W1, the P1Q2 length, the P2Q1 length, and the P3Q1 length) are stored. In the case of this example, the P3Q1 position is found as to the triangle W1, and the P3Q1 position is also found as to the triangle W2 (the positions of the same ridge endings corresponding to the same ridge bifurcations are found), but calculations may also be omitted as to the positions of the same points.

In step S19, the CPU 52 acquires via the USB controller 55 the ID of the user whose fingerprint is being read, which ID is supplied from the external apparatus which is not shown, and associates the acquired ID with the registered templates stored in the flash memory 54 (the registered templates stored in the flash memory 54 by the processing of steps S16 and S18), and causes the flash memory 54 to store the associated data.

Figure 6:
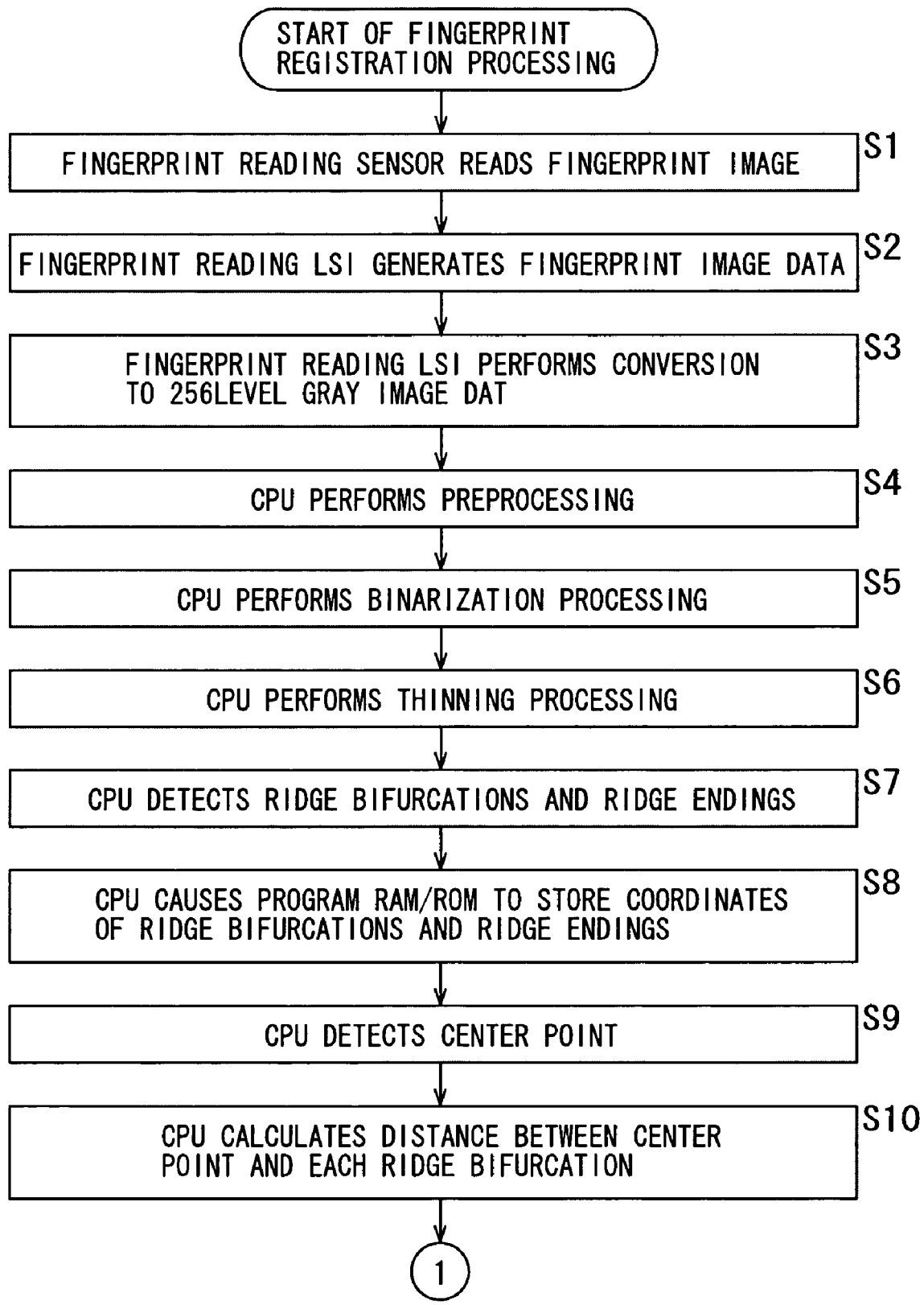
FIG. 6 is a flowchart for explaining fingerprint registration processing in the fingerprint registration apparatus of FIG. 3.
Figure 7:
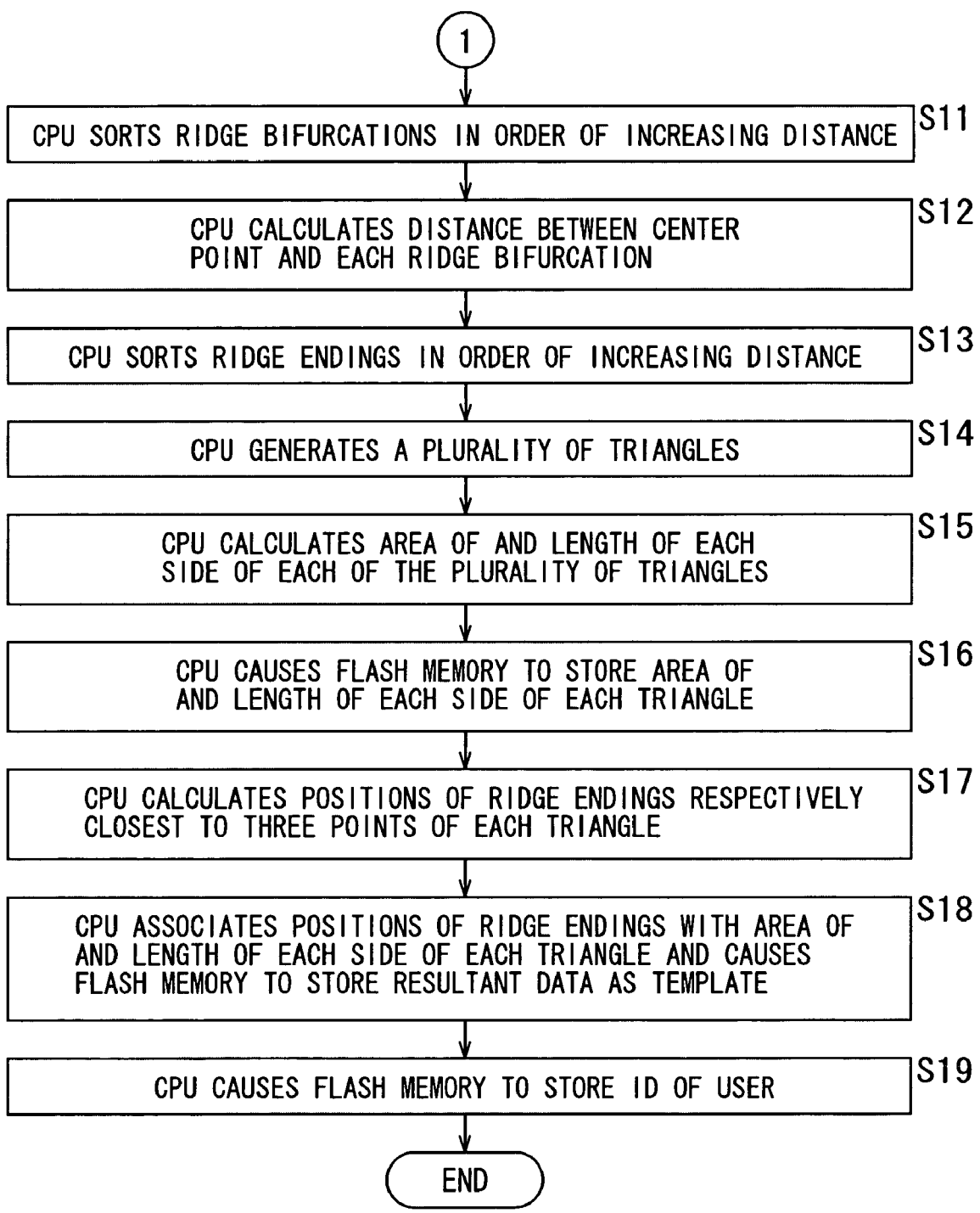
FIG. 7 is a flowchart for explaining the fingerprint registration processing in the fingerprint registration apparatus of FIG. 3.

Through the processing of FIGS. 6 and 7, the CPU 52 can cause the flash memory 54 to store the area and the length of each side of each of the plurality of triangles extracted from the fingerprint image as well as the positions (directions or distances) of the ridge endings corresponding to (closest to) particular ridge bifurcations (ridge bifurcations which constitute each of the triangles) as the features of the fingerprint together with the ID of the user.

In addition, the processing of storing the ID of the user in step S19 may also be performed in advance (before step S1) when the collation registration processing is to be started.

Next, a fingerprint collation processing in the fingerprint collation apparatus 1 shown in FIG. 2 will be described below with reference to the flowcharts of FIGS. 14 to 17. This processing is executed after the fingerprint registration processing of FIGS. 6 and 7, and is started when the finger of the user is pressed on the fingerprint reading sensor 21. Since the processing of steps S101 to S111 is approximately the same as steps S1 to S13 of FIG. 6 mentioned above, steps S101 to S111 will be described in brief.

In step S101, the fingerprint reading sensor 21 reads an image of the finger's fingerprint pressed in contact with the fingerprint reading sensor 21, and supplies a signal corresponding to the read image of the fingerprint to the fingerprint reading LSI 51.

In step S102, the fingerprint reading LSI 51 generates image data of the fingerprint from the signal corresponding to the fingerprint supplied from the fingerprint reading sensor 21.

In step S103, the fingerprint reading LSI 51 converts the generated image data of the fingerprint to 256-level gray image data, and supplies the converted 256-level gray image data to the CPU 52.

Figure 18:
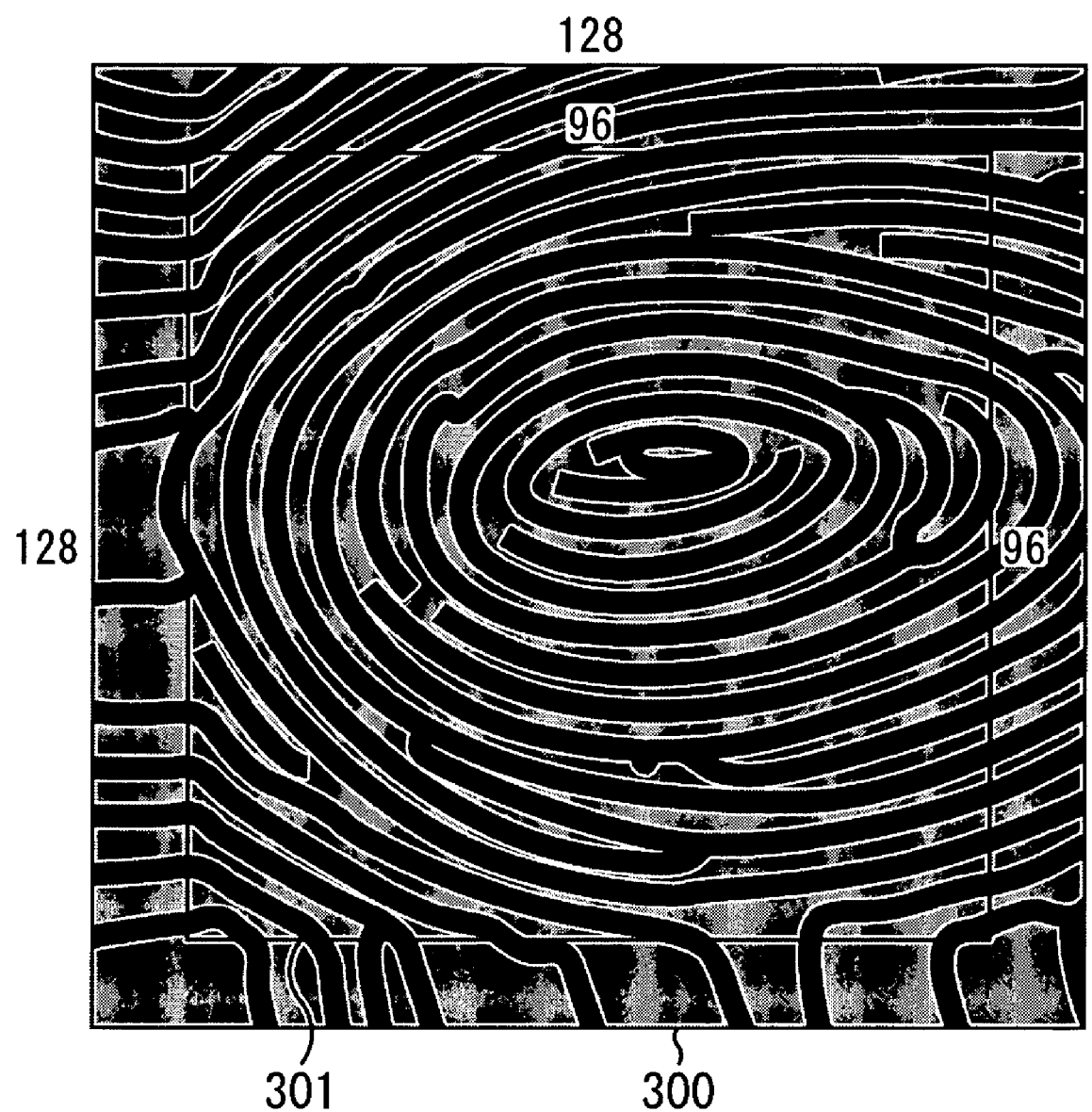
FIG. 18 is a view showing an image example according to step S104 of FIG. 14.

In step S104, the CPU 52 executes preprocessing, such as noise reduction and filling up small injuries in fingerprint ridges, on the converted gray image data. Specifically, data indicative of an image 300 having 128 pixels×128 pixels as shown in FIG. 18 is generated. An image 301 is an image having 96 pixels×96 pixels. The position of the fingerprint in the gray image shown in FIG. 18 is deviated toward the top right compared to the gray image 200 of FIG. 9.

Figure 19:
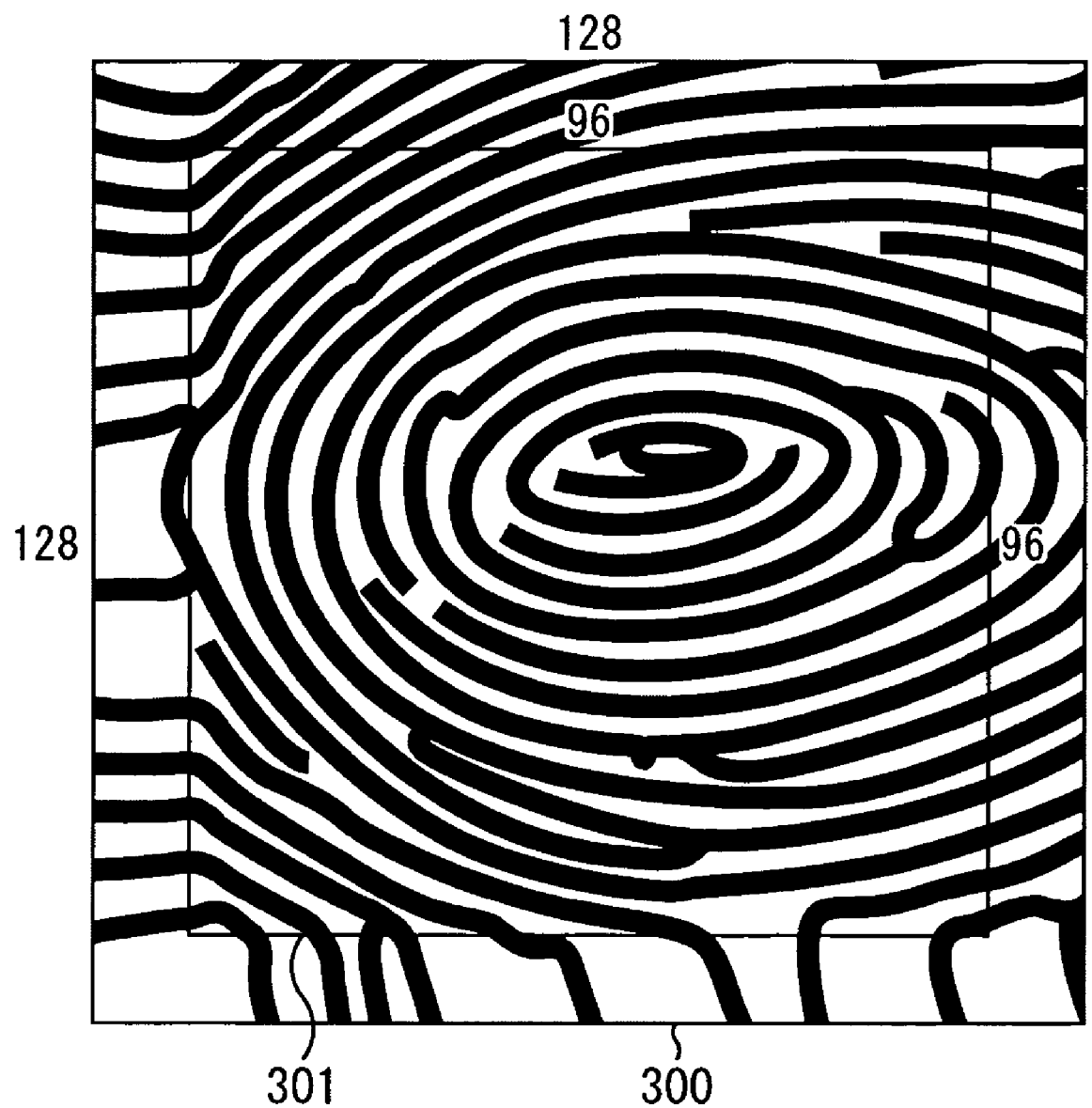
FIG. 19 is a view showing an image example according to step S105 of FIG. 14.

In step S105, the CPU 52 binarizes the preprocessed gray image data with a predetermined threshold and converts the preprocessed gray image data to binarized image data. FIG. 19 shows the binarized image.

Figure 20:
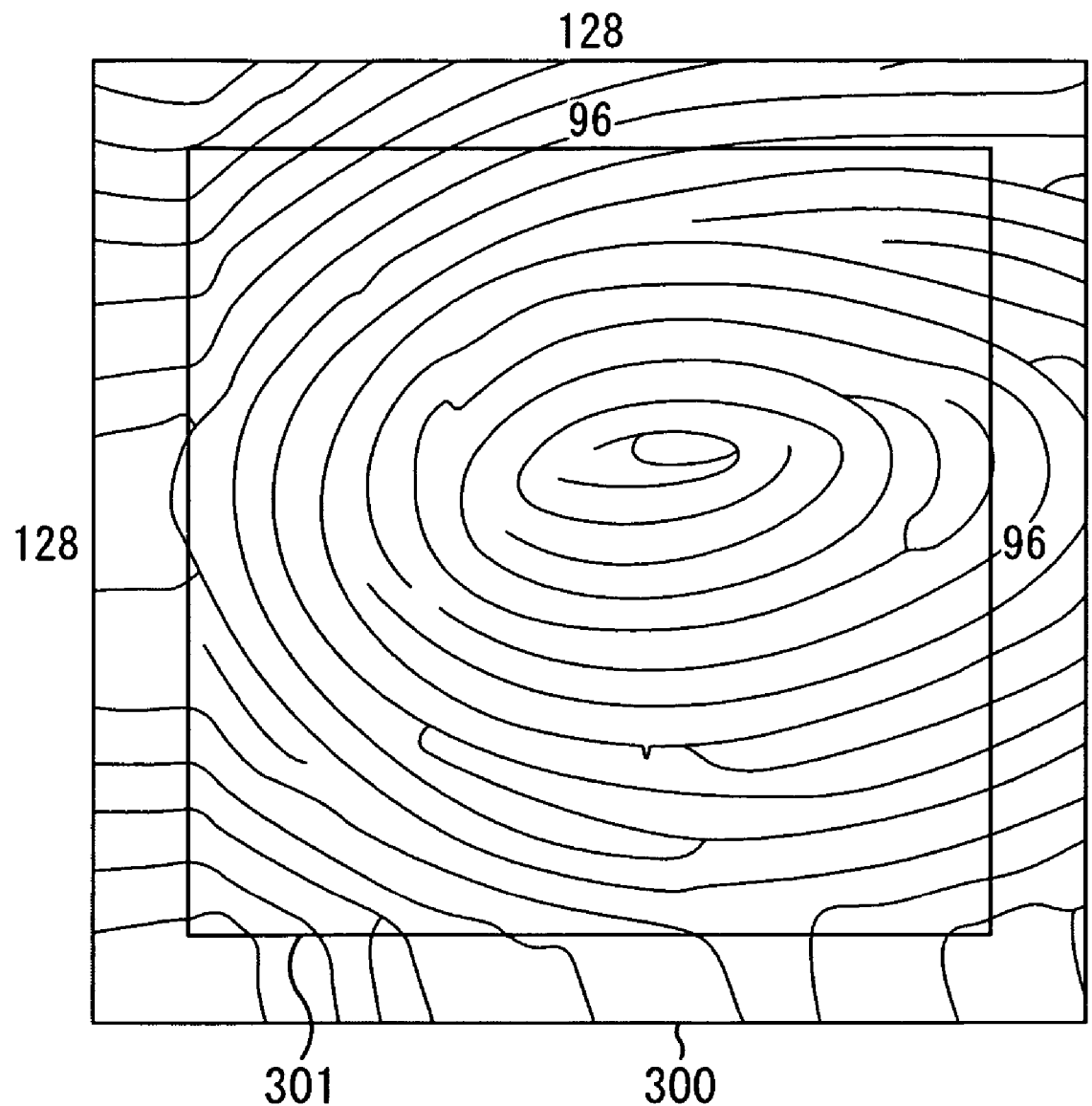
FIG. 20 is a view showing an image example according to step S106 of FIG. 14.

In step S106, the CPU 52 performs thinning processing, whereby the binarized image data is converted to the image shown in FIG. 20.

Figure 21:
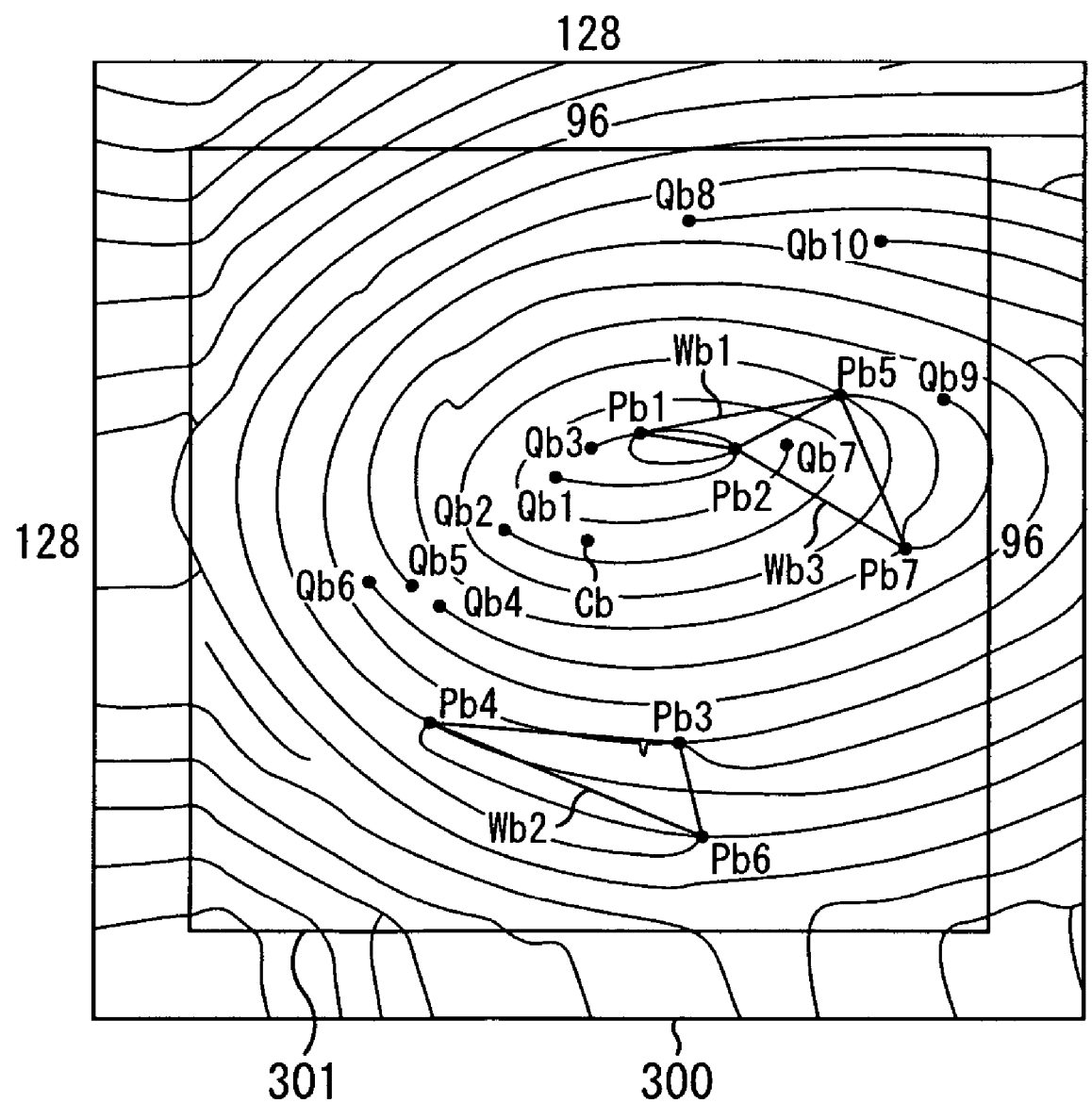
FIG. 21 is a view showing an image example according to step S107 of FIG. 14.

In step S107, the CPU 52 detects a maximum of 10 ridge bifurcations and a maximum of 10 ridge endings from the thinned image. The ridge bifurcations and the ridge endings detected by this processing are as shown in FIG. 21. The ridge bifurcations and the ridge endings are actually detected from the image 301 represented by 96 pixels×96 pixels in the image 300 represented by 128 pixels×128 pixels in FIG. 21. In FIG. 21, ridge bifurcations Pb1 to Pb7 (seven) are detected, and ridge endings Qb1 to Qb10 (ten) are detected.

In addition, in the case of this example, the CPU 52 detects a maximum of 10 ridge bifurcations and a maximum of 10 ridge endings, but this example is not limitative, like the processing of FIGS. 6 and 7 mentioned above. For example, each of the numbers of ridge bifurcations and ridge endings to be detected may be set to a maximum limit determined in advance, or to 10 or more. In addition, the CPU 52 detects the ridge bifurcations and the ridge endings from the image 301 represented by 96 pixels×96 pixels, but this example is not limitative. For example, an image formed by 112 pixels×112 pixels may also be used.

When FIG. 13 is compared with FIG. 21, the ridge bifurcation P1 of FIG. 13 corresponds to the ridge bifurcation Pb1 of FIG. 21, the ridge bifurcation P2 corresponds to the ridge bifurcation Pb2, the ridge bifurcation P3 corresponds to the ridge bifurcation Pb5, the ridge bifurcation P4 corresponds to the ridge bifurcation Pb7, the ridge bifurcation P5 corresponds to the ridge bifurcation Pb3, the ridge bifurcation P6 corresponds to the ridge bifurcation Pb4, and the ridge bifurcation P8 corresponds to the ridge bifurcation Pb6. In other words, FIG. 13 and FIG. 21 differ for the positions of the read images (the position at which the user places the fingerprint varies each time), so that the ridge bifurcation P7 detected in FIG. 13 is not detected in FIG. 21. In addition, the coordinates of a ridge bifurcation Pbi are the ridge bifurcation Pbi(xpbi, ypbi) (where i=1, 2, . . . , 7), and the coordinates of a ridge ending Qbi are the ridge ending Qbi (xqbi, yqbi) (where i=1, 2, . . . , 10).

In step S108, the CPU 52 causes the RAM section of the program RAM/ROM 53 to store the coordinates (x, y) of the detected ridge bifurcations and ridge endings (in other words, Pbi(xpbi, ypbi) (where i=1, 2, . . . , 7), and Qbi (xqbi, yqbi) (where i=1, 2, . . . , 10)). Since this storage is temporary, the coordinates are stored in the RAM section of the program RAM/ROM 53 (not in the flash memory 54).

In step S109, the CPU 52 detects a center point Cb (in, jn) of the fingerprint image. Since the image 300 is represented by 128 pixels×128 pixels, the CPU 52 may detect a preset point (64, 64) (or (63, 63)) as the center point similarly to the case of step S9 in FIG. 6 mentioned above.

In step S110, the CPU 52 calculates the distance between the center point Cb (in, jn) of the fingerprint image found by the processing of step S9 and each of the plurality of ridge bifurcations detected by the processing of step S107. In the case of this example, the distances between the center point Cb and the ridge bifurcations Pb1 to Pb7 are respectively calculated. If the distance between the center point Cb and the ridge bifurcation Pb1 is calculated as Lpb1, the distance between the center point Cb and the ridge bifurcation Pb2 is calculated as Lpb2, and the distance between the center point Cb and the ridge bifurcation Pb3 is calculated as Lpb3. Subsequently, the respective distances between the center point Cb and Pb4, Pb5, . . . , Pb7 are sequentially calculated as Lpb4, Lpb5, . . . , Lpb7.

In step S11, the CPU 52 sorts the distances calculated by the processing of step S110 (the distances between the center point Cb and the respective ridge bifurcations Pb1 to Pb7) in increasing order. In the case of this example, the distances from the center are sorted to be Lpb1<Lpb2<Lpb3<Lpb4<Lpb5<Lpb6<Lpb7.

In step S112, the CPU 52 calculates the distance between the center point Cb (in, jn) and each of the plurality of ridge endings detected by the processing of step S107. In the case of this example, the respective distances between the center point Cb and the ridge endings Qb1 to Qb10 are calculated. If the distance between the center point Cb and the ridge ending Qb1 is calculated as Lqb1, the distance between the center point Cb and the ridge ending Qb2 is calculated as Lqb2, and the distance between the center point Cb and the ridge ending Qb3 is calculated as Lqb3. Subsequently, the respective distances between the center point Cb and Qb4, Qb5, ..., Qb10 are sequentially calculated as Lqb4, Lqb5, ..., Lqb10.

In step S113, the CPU 52 sorts the distances calculated by the processing of step S12 (the distances between the center point C and the respective ridge endings Q1 to Q8) in increasing order. In the case of this example, the distances from the center are sorted to be Lqb1<Lqb2<Lqb3<Lqb4<Lqb5<Lqb6<Lqb7<Lqb8<Lqb9<Lqb10.

In step S114, the CPU 52 detects a ridge bifurcation closest to the center point Cb (in, jn) of the fingerprint (the center point found by the processing of step S109) and two ridge bifurcations closest to the ridge bifurcations, and generates a triangle which connects these three points. Specifically, in the case of the example shown in FIG. 21, the CPU 52 generates a triangle Wb1 which connects the ridge bifurcation Pb1 closest to the center point Cb, the ridge bifurcation Pb2 closet to the ridge bifurcation Pb1, and the ridge bifurcation Pb5. In other words, the CPU 52 generates the triangle Wb1 by connecting the following three points, the ridge bifurcation Pb1 (xpb1, ypb1) closest to the center point Cb (in, jn) (the ridge bifurcation Pb1 is selected because the distance Lpb1 from the center point Cb is smallest), and two ridge bifurcations Pb2 (xpb2, ypb2) and Pb3 (xpb3, ypb3) closest to the ridge bifurcation Pb1.

In addition, in the case of the example shown in FIG. 21, the triangle W1 corresponds to the triangle Wb1, the triangle W2 corresponds to a triangle Wb3 (the triangle Wb3 is not generated in this flowchart, but when all triangles are generated, the triangle Wb3 is generated), and the triangle W4 corresponds to a triangle Wb2 which will be described later. In other words, the triangle W3 of FIG. 13 is not generated in FIG. 21.

In step S115, the CPU 52 calculates an area Sb1 of the triangle Wb1 generated by the processing of step S114 (the triangle Wb1 made of the ridge bifurcations Pb1, Pb2 and Pb5).

In step S116, the CPU 52 causes the flash memory 54 to store the registered templates stored in the flash memory 54.

In step S117, the CPU 52 determines whether the registered templates stored in the flash memory 54 by the registered templates (the fingerprint registration processing) (the processing of FIGS. 6 and 7) contain a registered template having an area matching with the area Sb1 of the triangle Wb1 calculated in step S115. Since fingerprints are deformed to some extent by the influence of surrounding environments, physical conditions or the like, the CPU 52 sets an allowable range, and even if the CPU 52 does not find a complete match but can find a value within the allow range (in other words, smaller than a match threshold), the CPU 52 determines that the value is a match. In the case of this example, the triangle Wb1 of FIG. 21 corresponds to the triangle W1 of FIG. 13 found by the processing of step S15 in FIG. 7, whereby the CPU 52 determines that the area Sb1 is a match to the area S1.

If the CPU 52 determines in step S117 that there is a match to the area Sb1 of the triangle Wb1 (a triangle having an area matching with the area Sb1 is contained in the registered templates), the CPU 52 calculates the length of each side of the triangle Wb1 in step S118. Specifically, the Pb1Pb2 length, the Pb2Pb5 length and the Pb5Pb1 length are calculated. These lengths may also be calculated at the same time as the area in step S114.

In step S119, the CPU 52 determines whether the lengths of three sides constituting the triangle registered in the registered templates (in the case of this example, the triangle W1) which is determined to match by the processing of step S117 match with the lengths of the three sides calculated by the processing of step S118 (in the case of this example, the lengths of the three sides of the triangle Wb1). In the case of this example, the CPU 52 determines whether the P1P2 length, the P2P3 length and the P3P1 length which correspond to the triangle W1 (the lengths of the sides stored by the processing of step S16 in FIG. 7) respectively match with the Pb1Pb2 length, the Pb2Pb5 length and the Pb5Pb1 length of the three sides calculated by the processing of step S118. As a matter of course, the CPU 52 sets an allowable range, and even if the CPU 52 does not find a complete match but can find a value within the allow range (in other words, smaller than a match threshold), the CPU 52 determines that the value is a match. In the case of this example, since the ridge bifurcations P1, P2 and P3 which constitute the triangle W1 respectively correspond to the ridge bifurcations Pb1, Pb2 and Pb3 which constitute the triangle Wb1, the CPU 52 determines that the ridge bifurcations P1, P2 and P3 respectively match with the ridge bifurcations Pb1, Pb2 and Pb3.

If it is determined in step S119 that the length of each of the three sides of a triangle is a match, in step S120, the CPU 52 searches for ridge endings closest to three ridge bifurcations (in the case of this example, the ridge bifurcation Pb1, the ridge bifurcation Pb2 and the ridge bifurcation Pb5) which constitute the triangle (in the case of this example, the triangle Wb1 generated by the processing of step S114). In the case of this example, the ridge ending Qb3 (xqb3, yqb3) closest to the ridge bifurcation Pb1, the ridge ending Qb7 (xqb7, yqb7) closest to the ridge bifurcation Pb2, and the ridge ending Qb7 (xqb7, yqb7) closest to the ridge bifurcation Pb5 are searched for.

In step S121, the CPU 52 calculates the positions of the respective ridge endings searched for by the processing of step S120. Specifically, the Pb1Qb3 position, the Pb2Qb7 position and the Pb5Qb7 position are calculated.

The calculation of the lengths of the sides in step S118 and the search for and the calculation of the ridge endings in steps S120 and S121 can also be collectively performed during the calculation of the areas in step S115. However, if the areas do not match, the subsequent two calculations becomes unnecessary, and if the lengths of the sides do not match, the search for and the calculation of the ridge endings become unnecessary. Accordingly, the amount of calculation can be reduced by sequentially performing a calculation each time a decision is made as to the previous condition, with the result that a rapid decision can be achieved.

In step S122, the CPU 52 compares the respective positions between the three ridge bifurcations constituting the triangle determined to be a match in the processing of step S117 and the ridge endings closest the respective ridge bifurcations, with the corresponding Pb1Qb3, Pb2Qb7 and Pb5Qb7 positions which are calculated by the processing of step S121. In the case of this example, the positions between the three ridge bifurcations P1, P2 and P3 constituting the triangle W1, i.e., the P1Q2 position, the P2Q1 position, and the P3Q1 position which are stored by the processing of step S18 of FIG. 7, are respectively compared with the Pb1Qb3 position, the Pb2Qb7 position and the Pb5Qb7 position which are calculated by the processing of step S121.

In step S123, the CPU 52 determines whether the positions between three points constituting one of the triangles compared with each other in the processing of step S122 and the ridge endings closest to the respective three points match with the positions between three points constituting the other and the ridge endings closest to the respective three points. In the case of this example, the CPU 52 determines whether the P1Q2 position, the P2Q1 position, and the P3Q1 position respectively match with the Pb1Qb3 position, the Pb2Qb7 position and the Pb5Qb7 position. Since Pb1Qb3, Pb2Qb7 and Pb5Qb7 found from the triangle Wb1 respectively correspond to P1Q2, P2Q1 and P3Q1 found from the triangle W1, it is determined that a match is found. As a matter of course, it is determined that errors within a predetermined range (i.e., smaller than a match threshold) are matches. If it is determined that a match is found, the process proceeds to step S124 and the CPU 52 adds 1 to a counter (increments the counter by 1). In the case of this example, the value of the counter (whose initial value is 0) is set to 1.

In step S125, the CPU 52 determines whether the value of the counter is 2. The value of the counter is incremented when matches are found for the area and the length of each side of one generated triangle as well as all the positions between the ridge bifurcations and the ridge endings. In the case of this example, since the value of the counter is set to 1 (authentication has succeeded as to the one triangle), the CPU 52 determines in step S126 whether the next triangle can be generated. In other words, it is determined whether a triangle different from the so far generated triangles can be generated by connecting a ridge bifurcation second closest to the center point Cb and two ridge bifurcations closest to the ridge bifurcation. In the case of this example, the ridge bifurcation second closest to the center point Cb (the next to the ridge bifurcation P1 is P2 and a triangle to be generated from the ridge bifurcation P2 is the same as the triangle Wb1, so that a new triangle cannot be generated. However, the triangle Wb2 can be generated by using the ridge bifurcation P3 third closest to the center point Cb, so that it is determined that the next triangle can be generated.

If it is determined in step S126 that the next triangle can be generated, the CPU 52 proceeds to step S127 and generates the next triangle. In other words, since the ridge bifurcations Pb1 to Pb7 and the ridge endings Qb1 to Qb10 is detected from FIG. 21 by the processing of step S107, the CPU 52 generates the triangle Wb2 which connects the ridge bifurcation Pb3 third closest to the center point Cb and the two ridge bifurcations Pb4 and Pb6 closest to the ridge bifurcation Pb3, similarly to the case of the processing of step S14 of FIG. 6. As mentioned above, in the processing of step S126, a triangle including the ridge bifurcation Pb2 second closest to the center point Cb is also generated, but the triangle is the same as the triangle Wb1 because the ridge bifurcation Pb2 and two ridge bifurcations closest to the ridge bifurcation Pb2 are the ridge bifurcations Pb1 and Pb5. Accordingly, after that, a triangle including the ridge bifurcation Pb3 third closest to the center point Cb is generated.

After that, the process returns to step S115 and the CPU 52 calculates the area the triangle generated by the processing of step S127 (in the case of this example, Wb2) Subsequently, similar processing is repeated, and in the case of this example, since the triangle Wb2 corresponds to the triangle W4 of FIG. 13 which is registered in the registered template, it is determined that in the processing of each of steps S117, S119 and S123, the answer is YES (a match is found).

Consequently, in step S124, 1 is incremented to the counter. In the case of this example, the value of the counter is set to 2.

In step S125, the CPU 52 determines whether the value of the counter is 2. In the case of this example, it is determined that the value of the counter is 2 (because the triangle Wb1 matches with the triangle W1, and the triangle Wb2 matches with the triangle W4). The fact that the value of the counter is 2 indicates that the area and the length of each side of each triangle as well as the positions between the ridge bifurcations and the ridge endings completely match with those of the registered templates as to two different triangles generated from the ridge bifurcations of the fingerprint image. If it is determined that the value of the counter is 2, the CPU 52 proceeds to step S129 and outputs a signal indicating that authentication has succeeded (in other words, the registered user and the user who is presently being collated match with each other), and brings the processing to an end. The result of this collation is indicated by the lamp 22 and the lamp 23 of the body section 11.

If it is determined in step S117 that the areas do not match, if it is determined in step S119 that the lengths do not match, if it is determined in step S123 that the positions of the ridge endings do not match, or if it is determined in step S125 that the value of the counter is not 2 (in other words, if it is determined that a match is not found as to at least one element from among the area one triangle, the length of each side of the triangle and the positions between the ridge bifurcations and the ridge endings of the triangle), the CPU 52 proceeds to step S126 and determines whether the next triangle can be generated. The fact that the next triangle cannot be generated indicates that all the ridge bifurcations Pb1 to Pb7 detected by the processing of step S107 have been used to generate triangles which are not superposed on any of the triangles generated in the past. If it is determined that the next triangle cannot be generated, the CPU 52 proceeds to step S128 and outputs a signal indicating that authentication has failed (in other words, the registered user and the user who is presently being collated do not match with each other), and brings the processing to an end. The result of this collation is indicated by the lamp 22 and the lamp 23 of the body section 11.

Through the processing of FIGS. 14 to 17, fingerprint collation can be performed on the basis of the areas of the triangles found from the ridge bifurcations, the lengths of the three sides of each of the triangles and the positions of the ridge endings closest to the respective three ridge bifurcations. In addition, it is possible to rapidly search for a matching registered template by finding the center of the acquired fingerprint image and sequentially generating triangles from the ridge bifurcations closest to the center.

When the user is to place the finger on the fingerprint reading sensor 21, the user is to match the center of the finger with the center of the fingerprint reading sensor 21. Since the direction of the finger varies each time, there is a higher possibility that an image at a position farther from the center becomes an image more different from the registered image. Accordingly, in the case of a matching image, it is possible to rapidly obtain a decision result indicative of a match by making decisions in order from the center.

In the case of different triangles, the possibility that their areas match with each other is low compared to the lengths of their sides and the positions of their ridge endings. Accordingly, by making decisions as to the areas in advance, it is possible to reduce the number of unnecessary decisions and carry out a rapid decision.

The reason why it is assumed that authentication succeeds when all elements of two triangles match with one another (when the decision result is YES in step S125) (it is not assumed that authentication succeeds when all elements of all triangles match with one another) is that the fingerprint image pressed on and acquired through the fingerprint reading sensor 21 undergoes a deviation of a maximum of approximately 3 mm (the fingerprint image easily varies each time the finger is placed.) In other words, the reason is that when the fingerprint image undergoes a deviation, partly different triangles are generated (for example, in the case of the example of FIG. 21, a triangle corresponding to the triangle W3 of FIG. 13 is not generated).

Figure 14:
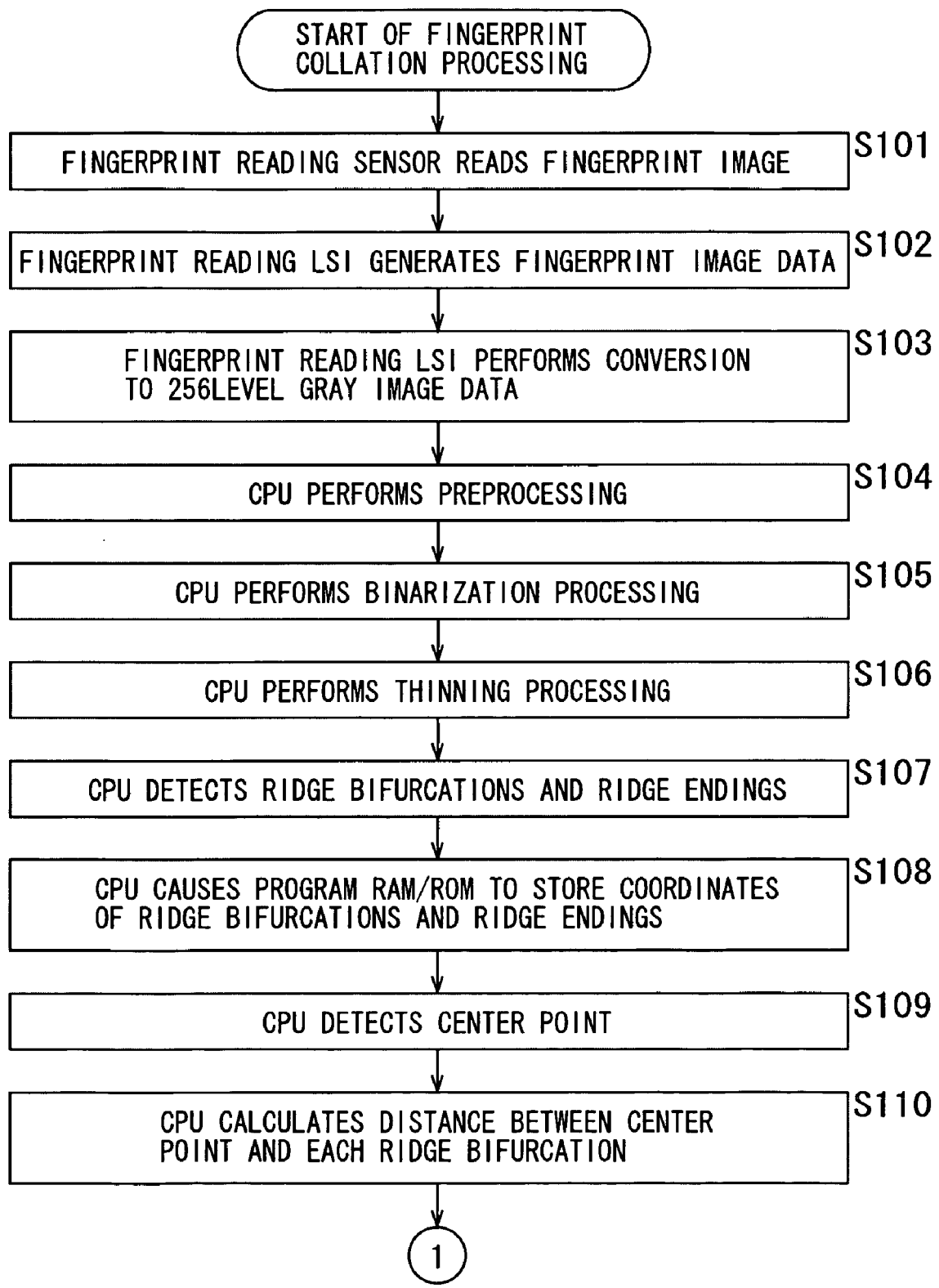
FIG. 14 is a flowchart for explaining fingerprint collation processing in the fingerprint registration apparatus of FIG. 3.
Figure 15:
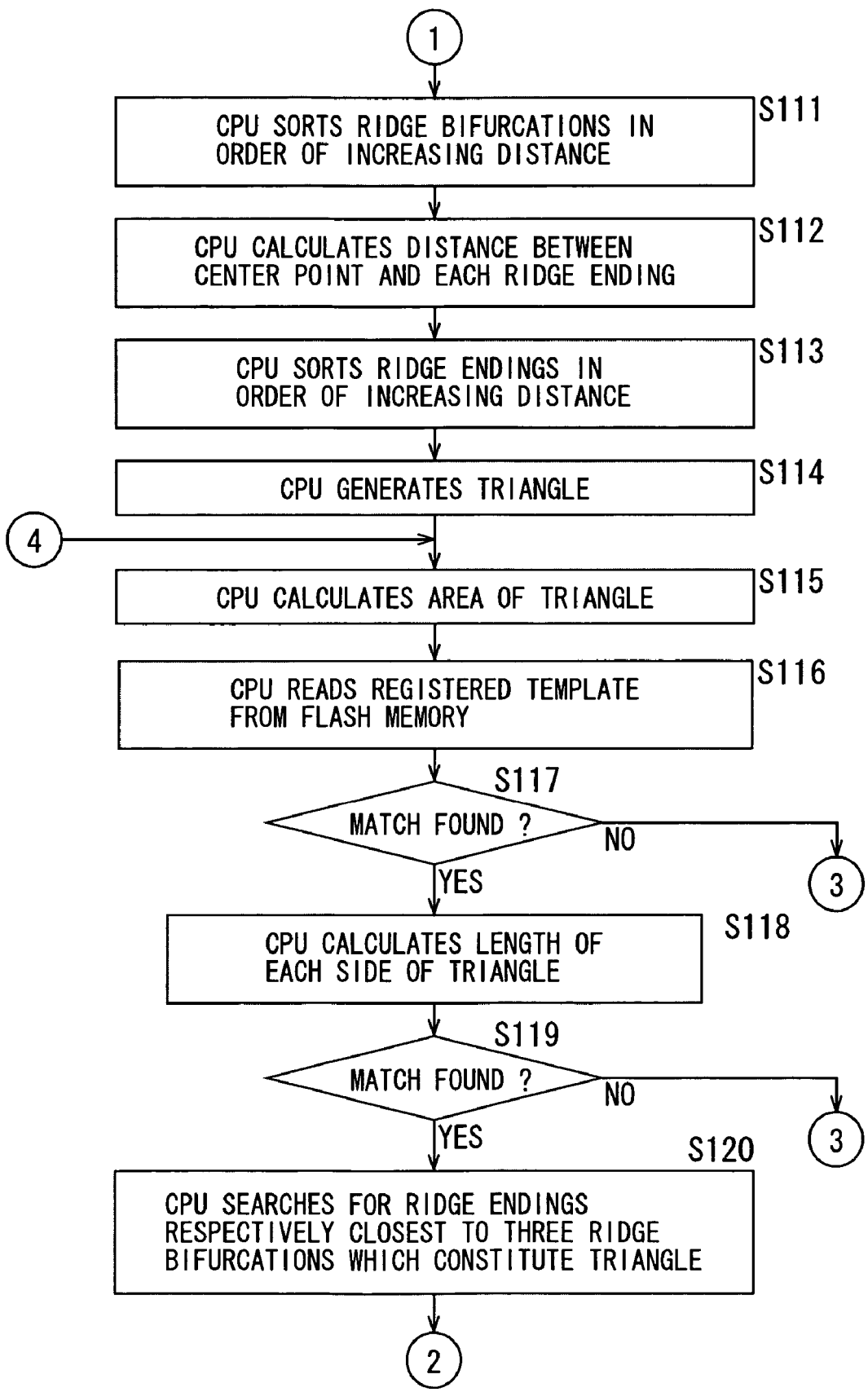
FIG. 15 is a flowchart for explaining fingerprint collation processing in the fingerprint registration apparatus of FIG. 3.
Figure 16:
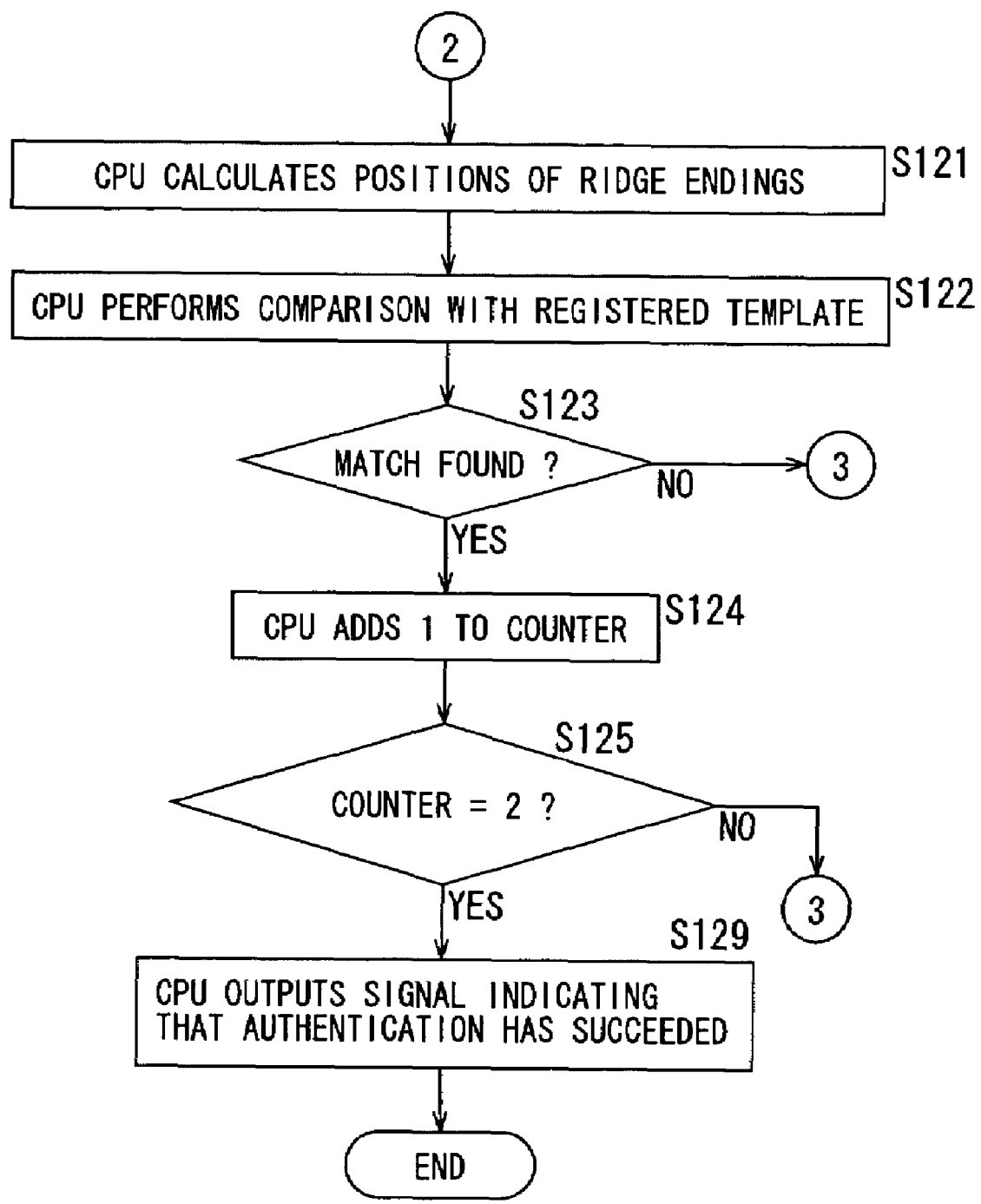
FIG. 16 is a flowchart for explaining fingerprint collation processing in the fingerprint registration apparatus of FIG. 3.
Figure 17:
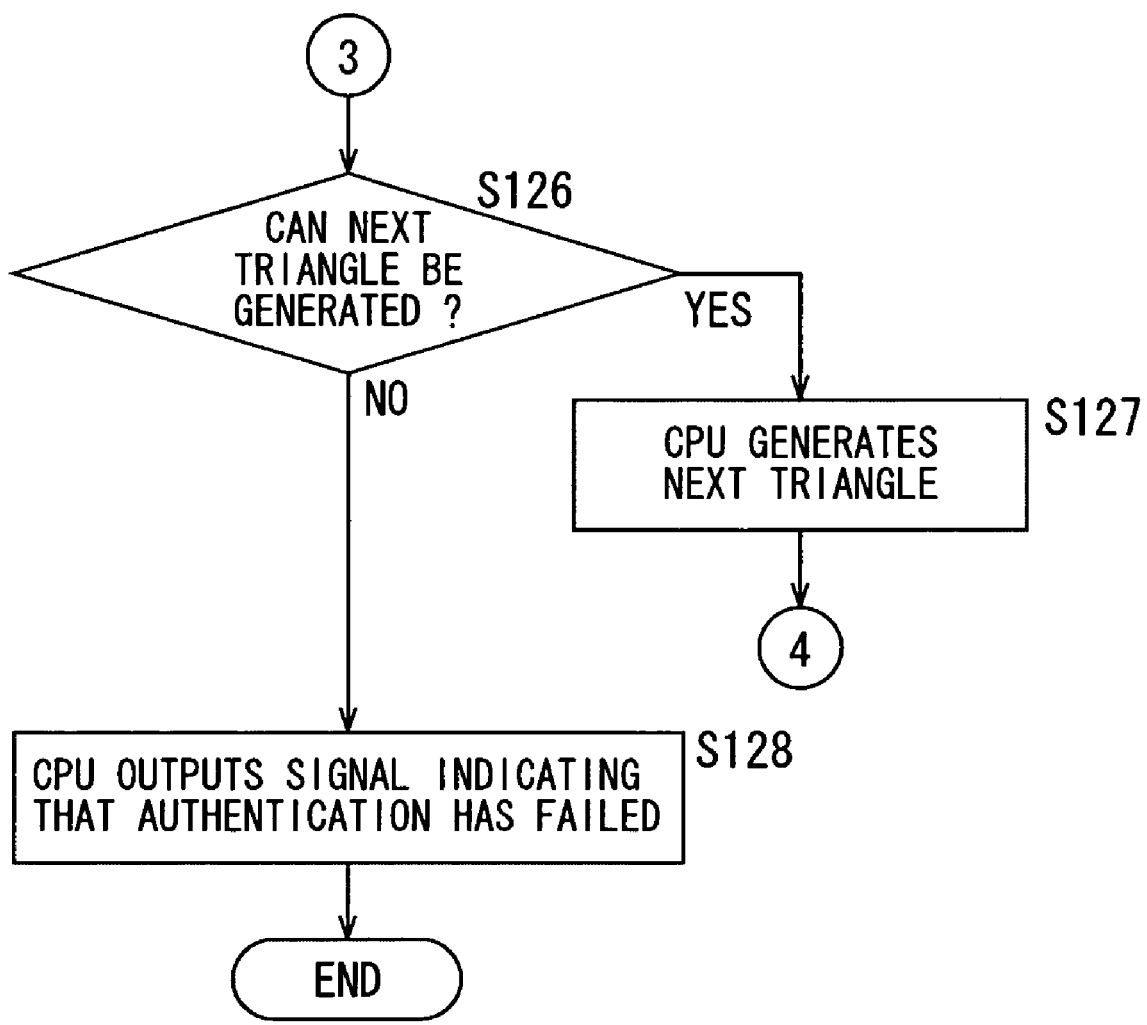
FIG. 17 is a flowchart for explaining fingerprint collation processing in the fingerprint registration apparatus of FIG. 3.
Figure 22:
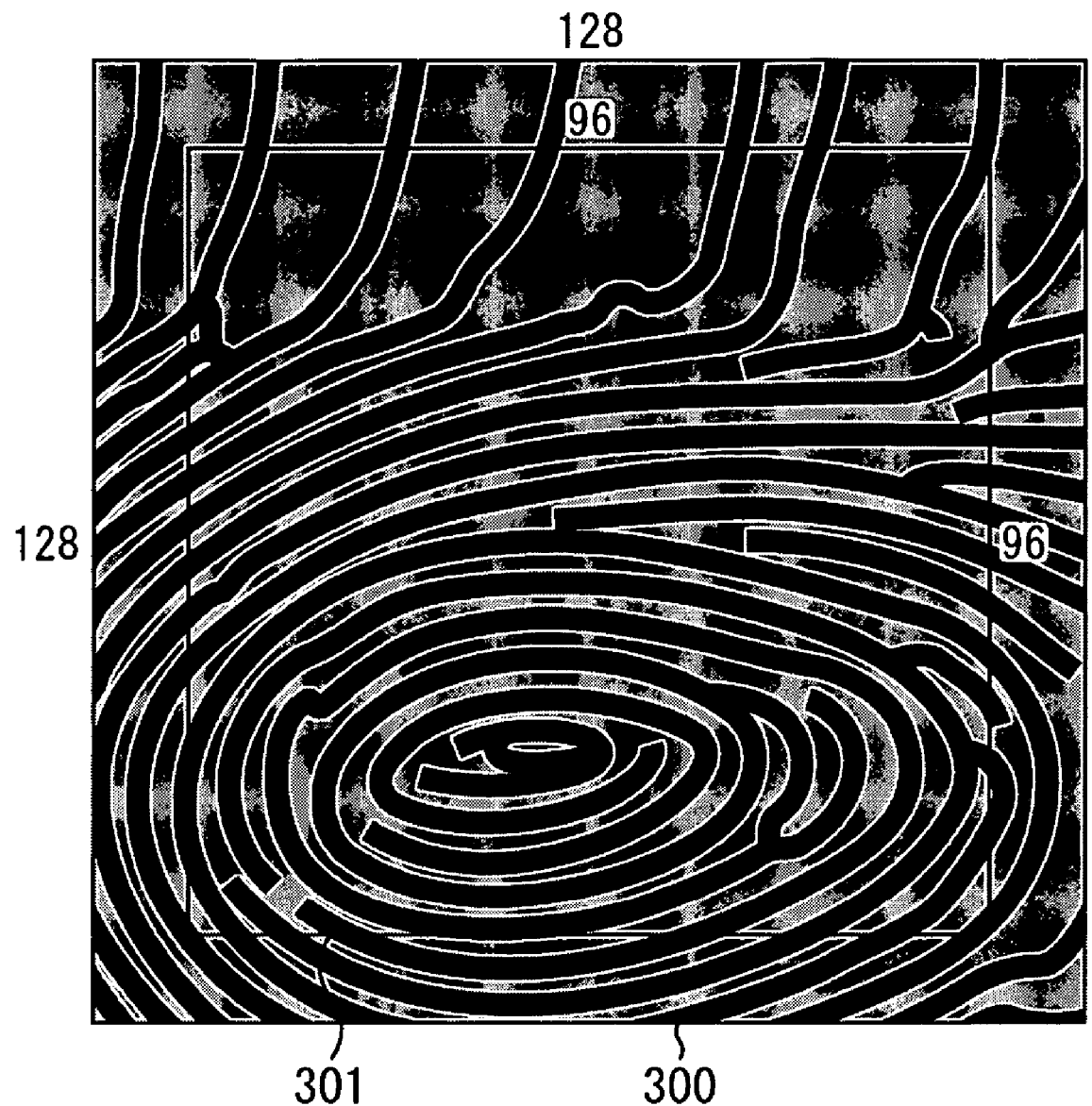
FIG. 22 is a view showing another image example according to step S104 of FIG. 14.

For example, if the preprocessed gray image obtained in the processing of step S104 of FIG. 14 is an image such as that shown in FIG. 22 (as a matter of course, the image is fingerprint image data acquired from the same finger), the image is largely deviated toward the bottom left compared to the registered image of FIG. 9 (the preprocessed gray image acquired by the processing of step S4 of FIG. 6).

Figure 23:
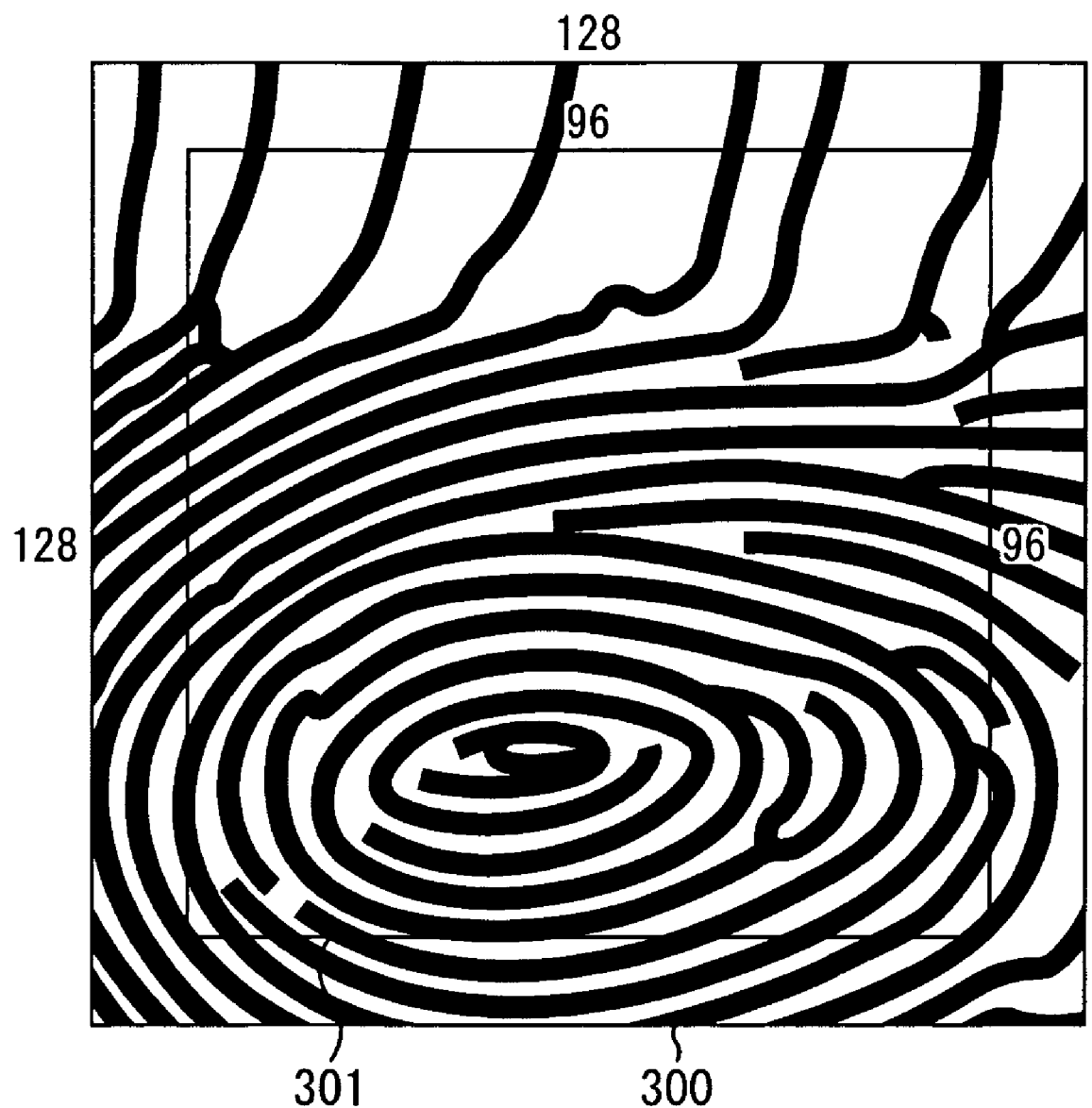
FIG. 23 is a view showing another image example according to step S105 of FIG. 14.
Figure 24:
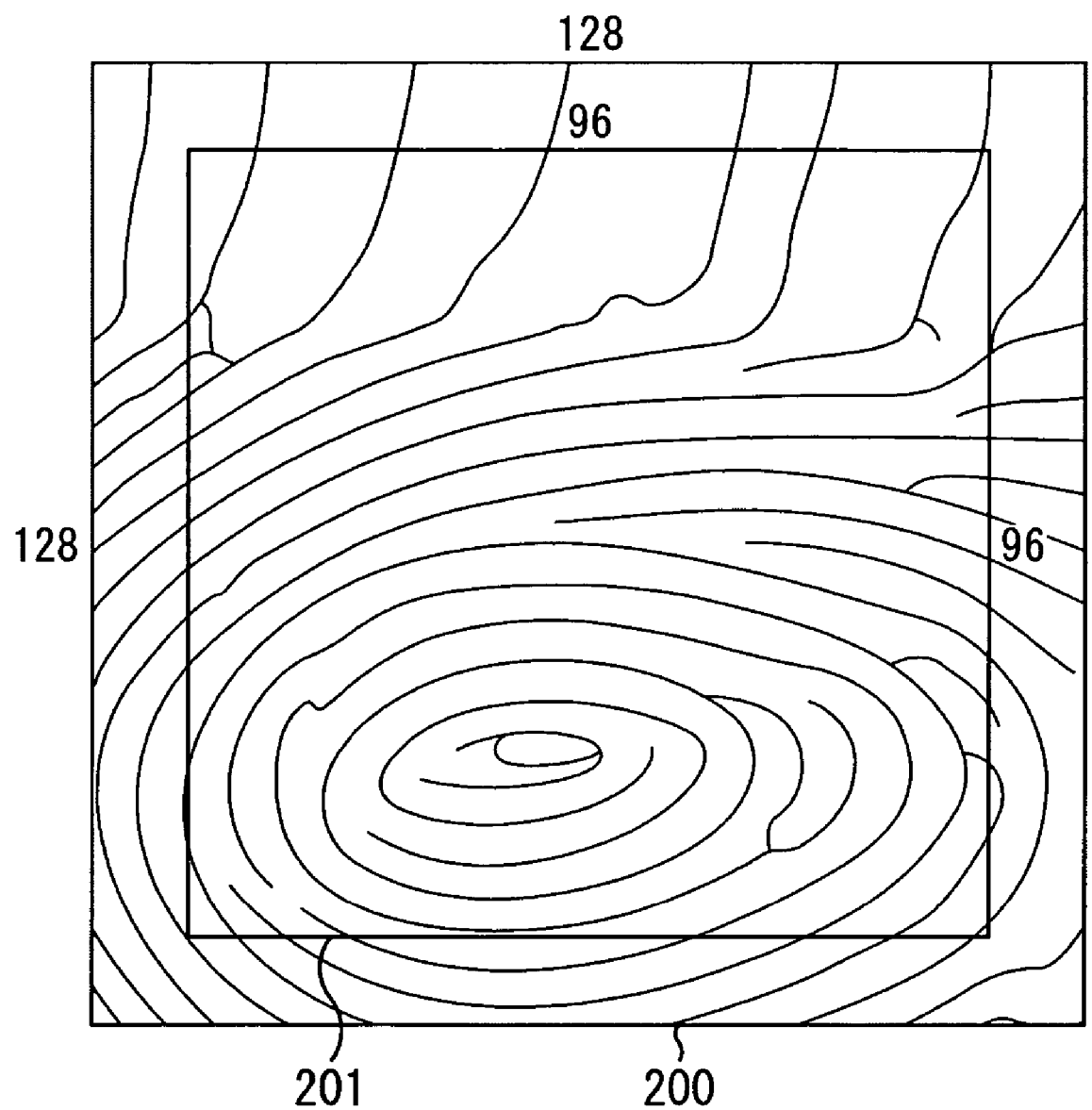
FIG. 24 is a view showing another image example according to step S106 of FIG. 14.
Figure 25:
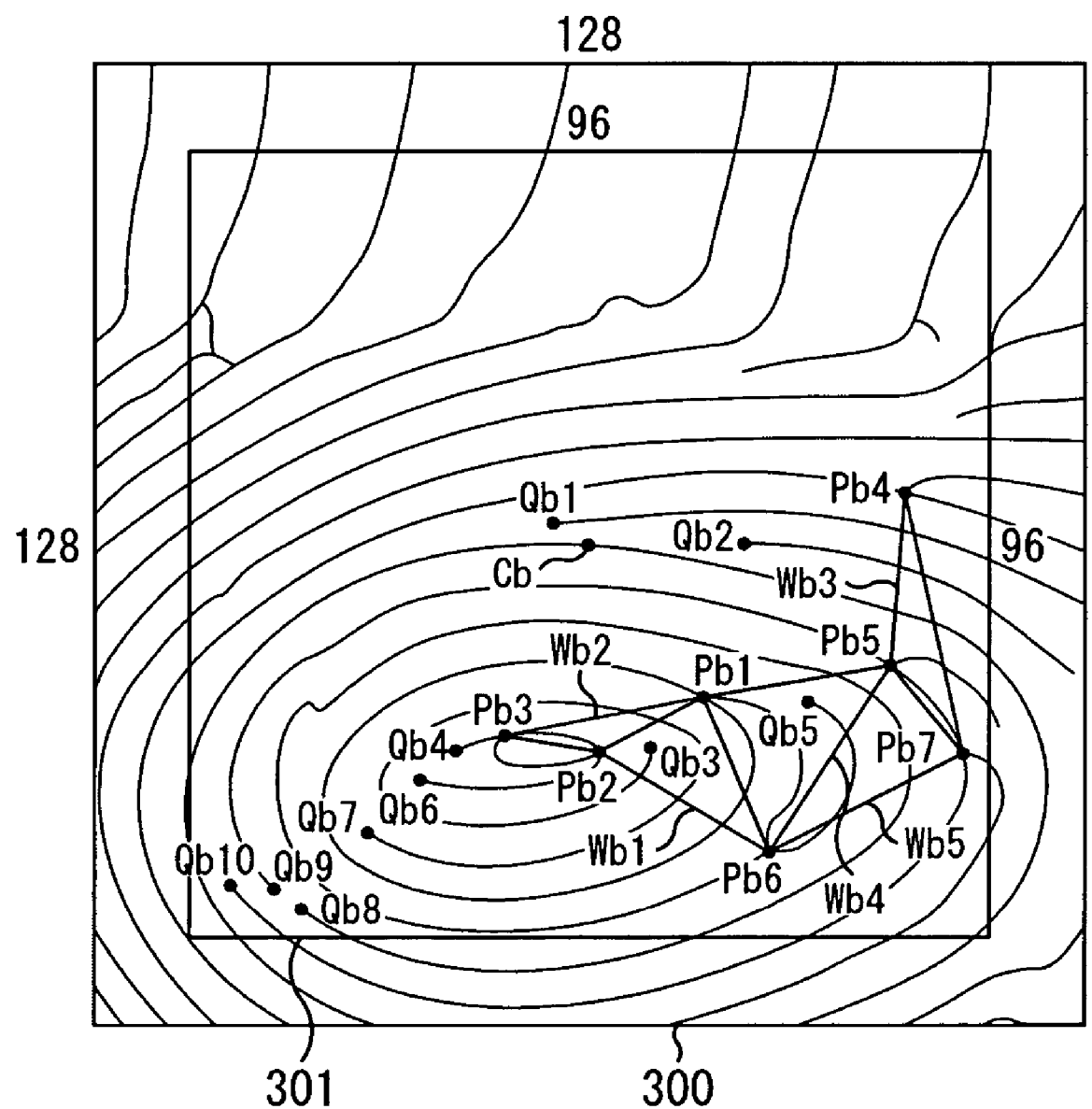
FIG. 25 is a view showing another image example according to step S107 of FIG. 14.

The gray image shown in FIG. 22 is converted as shown in FIG. 23 by binarization processing (the processing of step S105), and is further converted as shown in FIG. 24 by thinning processing (the processing of step S106). Then, the thinned image becomes as shown in FIG. 25 through the detection of ridge bifurcations and ridge endings (the processing of step S107). In FIG. 25, similarly to the case of FIG. 21, the ridge bifurcations are respectively set as Pb1 to Pb7 (in the case of the example shown in FIG. 25, only seven ridge bifurcations are detected), and the ridge endings are respectively set as Qb1 to Qb10 and the center point is set as Cb.

When FIGS. 13 and 25 are compared, the ridge bifurcation P1 of FIG. 13 corresponds to the ridge bifurcation Pb3 of FIG. 25, the ridge bifurcation P2 corresponds to the ridge bifurcation Pb2, the ridge bifurcation P3 corresponds to the ridge bifurcation Pb1, the ridge bifurcation P4 corresponds to the ridge bifurcation Pb6, and the ridge bifurcation P7 corresponds to the ridge bifurcation Pb5. In other words, FIGS. 13 and 25 differ in the positions of the acquired images, so that the ridge bifurcation P5, the ridge bifurcation P6 and the ridge bifurcation P8 detected in FIG. 13 are not detected in FIG. 25. Instead, in FIG. 25, the ridge bifurcation Pb4 and the ridge bifurcation Pb7 which are ridge bifurcations not detected in FIG. 13 are detected.

After having found the center point Cb of the recording medium interface (after the processing of step S109), or after having read the preset center point Cb set in advance, the CPU 52 sorts the distances between the center point Cb and the ridge bifurcations Pb1 to Pb7 in increasing order (step S111) and further sorts the distances between the center point Cb and the ridge endings Qb1 to Qb10 in increasing order (step S113), and generates triangles (the processing of step S114) In the case of the example shown in FIG. 25, two triangles (the triangle Wb1 and the triangle Wb2) are sequentially generated in step S114 or step S127. In the case of the example of FIG. 25, if all triangles that can be generated are generated, five triangles are generated (as a matter of course, triangles superposed on the respective five triangles are also generated) in the following order: the triangle Wb1 which connects three points, i.e., the ridge bifurcation Pb1, the ridge bifurcation Pb2 and the ridge bifurcation Pb6; the triangle Wb2 which connects three points, i.e., the ridge bifurcation Pb2, the ridge bifurcation Pb1 and the ridge bifurcation Pb3; the triangle Wb3 which connects three points, i.e., the ridge bifurcation Pb4, the ridge bifurcation Pb5 and the ridge bifurcation Pb7; a triangle Wb4 which connects three points, i.e., the ridge bifurcation Pb6, the ridge bifurcation Pb1 and the ridge bifurcation Pb5; and a triangle Wb5 which connects three points, i.e., the ridge bifurcation pb7, the ridge bifurcation Pb5 and the ridge bifurcation Pb6. In other words, triangles corresponding to the triangle Wb3 and the triangle Wb5 of FIG. 21 are not generated from the fingerprint image shown in FIG. 13 (in other words, since the corresponding triangles are not registered in the registered templates, it is determined that a match is not found as to either the triangles Wb3 or Wb5.

As a result, accurate collation is realized by adopting the processing of determining that authentication has succeeded, when two triangles which are not all triangles but a plurality of the triangles, as shown in FIGS. 14 to 20. Conversely, if the number of triangles is made 1, there is a high risk that a finger of a third party is erroneously authenticated.

The rate in which although a registered fingerprint is that of an authorized person, the authorized person is not correctly collated is called FRR (False Rejection Rate), while the rate in which although a registered fingerprint is that of an arbitrary unauthorized person, the unauthorized person is mistakenly collated is called FAR (False Acceptance Rate). A fingerprint collation apparatus having high FAR is a fingerprint collation apparatus having a low security quality which allows an unauthorized person to become an imposter of an authorized person.

FAR can be reduced by increasing a match threshold (by increasing the range of errors which can be regarded as matches, or by increasing a reference value (two) of the number of matching triangles). However, in this case, whether collation succeeds or fails is strongly affected by variations in collation environments (for example, noise which enters an acquired fingerprint image), and there are more cases in which authorized persons are not collated (in other words, FRR becomes higher), so that the convenience of users is lost. For this reason, the match threshold need be set to a value which can balance both FRR and FAR.

In the above-mentioned processing, fingerprint collation is performed by detecting ridge bifurcations and ridge endings of a fingerprint image, generating triangles each connecting three points close to the ridge bifurcations (or the ridge endings) on the basis of the distances from the center point of the fingerprint image, and registering the area and the lengths of the three sides of each of the generated triangles as well as the positions (distances or directions) between three ridge bifurcations and ridge endings closest to the respective three ridge bifurcations are registered. Accordingly, the amount of information to be saved (registered template size) can be made extremely small compared to conventional apparatuses, whereby the required memory capacity can be reduced.

In addition, since simple registered data (the areas of triangles, the lengths of the three sides of each of the triangles, and the positions between three ridge bifurcations and ridge endings closest to the respective ridge bifurcations) are used, collation can be performed with simple processing without the need to perform position or rotation correction of an image subject to collation. Accordingly, it is possible to increase processing speed.

Furthermore, it is possible to increase the accuracy of fingerprint collation.

In addition, the ridge bifurcations or the ridge endings are sorted on the basis of the distances from the center point, and the ridge bifurcations or the ridge endings are searched for in the order of the sorted result, whereby it is possible to rapidly specify other closest ridge bifurcations and ridge endings.

In addition, in the above-mentioned example, the distance and the direction of each of ridge endings closest to three ridge bifurcations are registered as a position and fingerprint collation is performed, but at least either the distance or the direction may also be registered.

Although the positions of ridge bifurcations and ridge endings of a fingerprint image may also be sorted from the top left of the acquired fingerprint image, the fingerprint image pressed on and acquired through the fingerprint reading sensor 21 undergoes a deviation of a maximum of approximately 3 mm (the fingerprint image easily varies each time the finger is placed). For this reason, the center of the fingerprint image is found and the positions of the ridge bifurcations and the ridge endings relative to the center point are found, whereby it is possible to easily search for a matching registered template.

In addition, in the above-mentioned example, a triangle is generated from three ridge bifurcations, but a triangle may also be generated from ridge endings. In this case, triangles are generated from ridge endings, and the distances of sides constituting each of the triangles as well as the positions between three ridge endings constituting each of the triangles and ridge bifurcations closest to the respective three ridge endings are found.

In addition, in the above-mentioned example, each triangle is generated from three ridge bifurcations and is stored, but this configuration is not limitative and polygons having four or more sides can also be generated. The generation of triangles, however, makes it possible to reduce FAR and FRR far largely and realize most accurate and rapid decisions.

The above-mentioned sequence of processing can be executed by hardware, and can also be executed by software. In the case where the sequence of processing is executed by software, a program which constitutes the software is installed from a recording medium into a computer incorporated in dedicated hardware, or into, for example, a general-purpose personal computer capable of executing various functions by the installation of various kinds of programs.

This recording medium, as shown in FIG. 3, is made of a package medium on which a program is recorded and which is distributed separately from a computer in order to provide the program for a user, for example, a magnetic disc 71 (including a flexible disc), an optical disc 72 (including a CD-ROM (Compact Disc-Read Only Memory) or a DVD (Digital Versatile Disc)), a magneto-optical disc 73 (including an MD (Mini-Disc) (trademark)), or a semiconductor memory 74. Otherwise, the recording medium is made of the program RAM/ROM 53, a hard disk drive or the like on which a program is recorded and which is provided to a user incorporated in a computer.

The program for executing the above-mentioned sequence of processing, as required, may also be installed into a computer via a wired or wireless communication medium such as a local area network, the Internet or digital satellite broadcasting via an interface such as a router or a modem.

In the present specification, the steps which describe the program stored in the recording medium include not only processing which is performed in the above-described order in a time-series manner, but also processing which is not necessarily processed in a time-series manner but is executed in parallel or individually.

INDUSTRIAL APPLICABILITY

As described above, according to the first invention, it is possible to reduce the amount of information to be used for fingerprint collation, and it is possible to reduce the size and the cost of a storage apparatus. Accordingly, the first invention can be applied to small apparatuses.

According to the second invention, it is possible to perform fingerprint collation. Among other thins, it is possible to perform fingerprint collation with a small amount of information. It is also possible to increase the processing speed of fingerprint collation. Furthermore, it is possible to increase the accuracy of fingerprint collation.

The invention claimed is:

1. A fingerprint information processing apparatus comprising:
    first detection means for detecting from a fingerprint image first feature points which are either ridge bifurcations or ridge endings of a fingerprint;
    second detection means for detecting a center point which is a center of a registered image;
    determination means for determining distances between the center point and each of the plurality of first feature points;
    sorting means for sorting the first feature points in order of the distance determined by the determination means;
    first generation means for generating a plurality of triangles, each triangle connecting three points selected from the plurality of first feature points,
        wherein in each triangle, the three points include a first point which is selected from the sorted first feature points sorted by the sorting means, in order of increasing distance from the center point, and a second point which is closest to the first point in the triangle, and a third point which is second closest to the first point in the triangle;
    first calculation means for calculating an area and a length of each side of the triangle generated by the first generation means; and
    storage means for storing the area and the length of each side of the triangle calculated by the first calculation means.

2. The information processing apparatus as described in claim 1, wherein:
    the first detection means further detects second feature points which are between the ridge bifurcations and the ridge endings, and
    further including:
        second calculation means for calculating:
            at least one of a distance and a direction between a first point and a fourth point which is the one of the second feature points that is closest to the first point,
            at least either a distance and a direction between a second point and a fifth point which is the one of the second feature points that is closest to the second point, and
            at least one of a distance and a direction between a third point and a sixth point which is the one of the second feature points that is closet to the third point and the three first feature points which constitute the one triangle are, respectively, the first point, the second point and the third point;
        the storage means further stores at least one of the distance and the direction calculated by the second calculation means, between the first point and the fourth point, between the second point and the fifth point, and between the third point and the sixth point.

3. The information processing apparatus as described in claim 2, wherein
    the second calculation means calculates at least one of the distance and the direction between the first point and the fourth point, between the second point and the fifth point, and between the third point and the sixth point by using the sorted second feature points.

4. The information processing apparatus as described in claim 1, further comprising:
    second calculation means for calculating an area and a length of each side of the triangle generated by the second generation means; and comparison means for comparing an area and a length of each side of the triangle stored in the storage means with the area and the length of each side of the triangle of the fingerprint image subject to collation calculated by the second calculation means.

5. An information processing method comprising:

a first detection step of detecting, utilizing a first detection means, from a fingerprint image first feature points which are either ridge bifurcations or ridge endings of a fingerprint;

a second detection step of detecting, utilizing a second detection means, a center point, which is a center of a registered image;

a determination step of determining, utilizing a determination means, distances between the center point and each of the plurality of first feature points;

a sorting step of sorting, utilizing a sorting means, the first feature points in order of the distance determined in the determination step;

a first generation step of generating, utilizing a generation means, a plurality of triangles, each triangle connecting three points selected from the plurality of first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

a first calculation step of calculating, utilizing a calculation means, an area and a length of each side of the triangle generated by the processing of the first generation step; and a storage control step of storing, utilizing a storage means, the area and the length of each side of the triangle calculated by the processing of the first calculation step.

6. A computer-readable medium for storing a program recorded on a recording medium the program comprising:

a first detection step of detecting from a fingerprint image first feature points which are either ridge bifurcations or ridge endings of a fingerprint;

a second detection step of detecting a center point, which is a center of a registered image;

a determination step of determining distances between the center point and each of the plurality of first feature points;

a sorting step of sorting the first feature points in order of the distance determined in the determination step;

a first generation step of generating a plurality of triangles, each triangle connecting three points selected from the plurality of first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

a first calculation step of calculating an area and a length of each side of the triangle generated by the processing of the first generation step; and a storage control step of controlling storage of the area and the length of each side of the triangle calculated by the processing of the first calculation step.

7. A program encoded on a computer-readable medium, comprising the steps of:

detecting from a fingerprint image first feature points which are one of ridge bifurcations and ridge endings of a fingerprint;

detecting a center point, which is a center of a registered image;

determining distances between the center point and each of the plurality of first feature points;

sorting the first feature points in order of the distance determined in the determining step;

generating a plurality of triangles, each triangle connecting three points selected from the plurality of first feature points, as a function of the sorted first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

calculating an area and a length of each side of the triangle generated by the processing of the first generation step; and storing the area and the length of each side of the triangle calculated by the processing of the first calculation step.

8. An information processing apparatus comprising:

first detection means for detecting first feature points which are either ridge bifurcations or ridge endings of a fingerprint from a registered fingerprint image subject to collation;

second detection means for detecting a center point of the registered fingerprint image;

determination means for determining distances between the center point and each of the plurality of first feature points;

sorting means for sorting the first feature points in order of the distance determined by the determination means;

first generation means for generating a plurality of triangles, each triangle connecting three points selected from the plurality of first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

first calculation means for calculating an area and a length of each side of the triangle generated by the first generation means; and comparison means for comparing the area and the length of each side of the triangle of the fingerprint image subject to collation, which are calculated by the first calculation means, with an area and a length of each side of a triangle of a fingerprint image previously stored.

9. The information processing apparatus as described in claim 8, wherein:

the first detection means further detects second feature points which are other ones of the ridge bifurcations and the ridge endings; and further includes second calculation means for calculating at least one of:

a distance or a direction between a first point and a fourth point which is the one of the second feature points that is closest to the first point, at least one of a distance and a direction between a second point and a fifth point which is the one of the second feature points that is closest to the second point, and at least one of a distance and a direction between a third point and a sixth point which is the one of the second feature points that is closest to the third point, and wherein the three first feature points which constitute the one triangle are, respectively, the first point, the second point and the third point; and the comparison means compares an area and a length of each side of the triangle of the fingerprint image subject to collation, which are calculated by the first calculation means and the second calculation means, as well as at least one of the distance and the direction of the fourth point relative to the first point, of the fifth point relative to the second point, and of the sixth point relative to the third point, with an area and a length of each side of the triangle of the stored fingerprint image as well as at least one of the distance and the direction of the fourth point relative to the first point, of the fifth point relative to the second point, and of the sixth point relative to the third point of the fingerprint image subject to collation.

10. A fingerprint information processing method comprising:

a first detection step of detecting, utilizing a first detection means, first feature points which are one of ridge bifurcations or ridge endings of a fingerprint, from a registered fingerprint image subject to collation;

a second detection step of detecting, utilizing a second detection means, a center point, which is a center of the registered fingerprint image;

a determination step of determining, utilizing a determination means, distances between the center point and each of the plurality of first feature points;

a sorting step of sorting, utilizing a sorting means, the first feature points in order of the distance determined in the determination step;

a first generation step of generating, utilizing a generation means, a plurality of triangles, each triangle connecting three points selected from the plurality of first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

a first calculation step of calculating, utilizing a calculation means, an area and a length of each side of the triangle generated by the processing of the first generation step; and a comparison step of comparing, utilizing a comparison means, the area and the length of each side of the triangle of the fingerprint image subject to collation, which are calculated by the first calculation means, with an area and a length of each side of a triangle of a fingerprint image previously stored.

11. A computer-readable medium for storing a fingerprint information processing computer-executable program comprising:

a first detection step of detecting first feature points which are one of ridge bifurcations or ridge endings of a fingerprint, from a registered fingerprint image subject to collation;

a second detection step of detecting a center point, which is a center of the registered fingerprint image;

a determination step of determining distances between the center point and each of the plurality of first feature points;

a sorting step of sorting the first feature points in order of the distance determined in the determination step;

a first generation step of generating a plurality of triangles, each triangle connecting three points selected from the plurality of first feature points, wherein in each triangle, the three points include a first point which is selected from the sorted first feature points sorted by the sorting means, in order of increasing distance from the center point, and a second point which is closest to the first point in the triangle, and a third point which is second closest to the first point in the triangle;

a first calculation step of calculating an area and a length of each side of the triangle generated by the processing of the first generation step; and a comparison step of comparing the area and the length of each side of the triangle of the fingerprint image subject to collation, which are calculated by the first calculation means, with an area and a length of each side of a triangle of a fingerprint image previously stored.

* * * * *